(12) United States Patent
Li et al.

(10) Patent No.: US 11,134,365 B2
(45) Date of Patent: Sep. 28, 2021

(54) RESOURCE LINK MANAGEMENT AT SERVICE LAYER

(71) Applicant: Convida Wireless, LLC, Wilmington, DE (US)

(72) Inventors: Xu Li, Plainsboro, NJ (US); Dale N. Seed, Allentown, PA (US); Qing Li, Princeton Junction, NJ (US); Lijun Dong, San Diego, CA (US); Guang Lu, Thornhill (CA); Chonggang Wang, Princeton, NJ (US); Catalina M. Mladin, Hatboro, PA (US); Hongkun Li, Malvern, PA (US); William Robert Flynn, IV, Schwenksville, PA (US); Phillip Brown, Los Angeles, CA (US)

(73) Assignee: Convida Wireless, LLC, Wilmington, DE (US)

( * ) Notice: Subject to any disclaimer, the term of this patent is extended or adjusted under 35 U.S.C. 154(b) by 254 days.

(21) Appl. No.: 15/538,072

(22) PCT Filed: Dec. 29, 2015

(86) PCT No.: PCT/US2015/067773
§ 371 (c)(1),
(2) Date: Jun. 20, 2017

(87) PCT Pub. No.: WO2016/109473
PCT Pub. Date: Jul. 7, 2016

(65) Prior Publication Data
US 2017/0373919 A1 Dec. 28, 2017

Related U.S. Application Data

(60) Provisional application No. 62/097,326, filed on Dec. 29, 2014.

(51) Int. Cl.
*H04W 4/70* (2018.01)
*H04L 29/08* (2006.01)
*H04L 29/06* (2006.01)

(52) U.S. Cl.
CPC ......... *H04W 4/70* (2018.02); *H04L 29/08027* (2013.01); *H04L 69/324* (2013.01); *H04L 63/162* (2013.01); *H04L 67/26* (2013.01)

(58) Field of Classification Search
CPC . H04L 29/08027; H04L 63/162; H04L 67/10; H04L 67/12; H04L 67/125;
(Continued)

(56) References Cited

U.S. PATENT DOCUMENTS 6,651,097 B1 * 11/2003 Maruyama ............... G09B 5/14
709/223
9,549,038 B1 * 1/2017 Anne .................. H04L 67/2842
(Continued)

FOREIGN PATENT DOCUMENTS

CN 102025577 A 4/2011
CN 102186164 A 9/2011
(Continued)

OTHER PUBLICATIONS

Web Linking, IETF RFC 5988, Oct. 2010, 23 pages.
(Continued)

*Primary Examiner* — Christopher Biagini
(74) *Attorney, Agent, or Firm* — BakerHostetler

(57) ABSTRACT

A link management service may dynamically configure one or more link-enabling attributes based on a link profile. There may be multiple types of architectures that support the link management service, such as an independent link management and integrated link management.

8 Claims, 29 Drawing Sheets

(58) Field of Classification Search
CPC ....... H04L 67/16; H04L 67/26; H04L 69/324; H04W 4/70; H04W 84/18
See application file for complete search history.

(56) References Cited

U.S. PATENT DOCUMENTS

| | | | | |
|---|---|---|---|---|
| 2006/0274869 A1* | 12/2006 | Morse | ................... | H04L 67/303 375/352 |
| 2007/0083519 A1* | 4/2007 | Daniels | ................. | G06Q 30/00 |
| 2008/0235573 A1* | 9/2008 | Serdy | ................. | G06F 16/9577 715/239 |
| 2010/0172454 A1 | 7/2010 | Denteneer | | |
| 2011/0178973 A1* | 7/2011 | Lopez | ................... | G06N 5/025 706/48 |
| 2012/0254407 A1* | 10/2012 | Li | ........................ | H04W 4/025 709/224 |
| 2014/0059174 A1* | 2/2014 | Chouanard | ......... | H04L 63/0823 709/217 |
| 2014/0233473 A1 | 8/2014 | Lu et al. | | |
| 2014/0359131 A1 | 12/2014 | Seed et al. | | |

FOREIGN PATENT DOCUMENTS

| | | |
|---|---|---|
| CN | 102624909 A | 8/2012 |
| CN | 102835176 A | 12/2012 |
| CN | 103532823 A | 1/2014 |
| JP | 2010-124375 A | 6/2010 |
| JP | 2010-530168 | 9/2010 |
| JP | 2012-209794 A | 10/2012 |
| WO | 2014/127255 A1 | 8/2014 |
| WO | 2014/185754 A1 | 11/2014 |

OTHER PUBLICATIONS

Hyperlink Definition. http://en.wikipedia/org/wiki/Hyperlink retrieved Jul. 27, 2018, 5 pages.
Constrained RESTful Environments (CoRE) Link Format. IETF RFC 6690, Aug. 2012, 22 pages.
Communication Link Definition. http://en.wikipedia.org/wiki/Telecomunications link retrieved Jul. 27, 2018, 4 pages.
One M2M Technical Specification, Service Component Architecture, TS-0007-V0-3-0, 105 pages, Jun. 17, 2014.
oneM2M Functional Architecture Baseline Draft, one M2M Technical Specification, oneM2M-TS-0001-V0-8-0, 297 pages, Aug. 1, 2014.

* cited by examiner

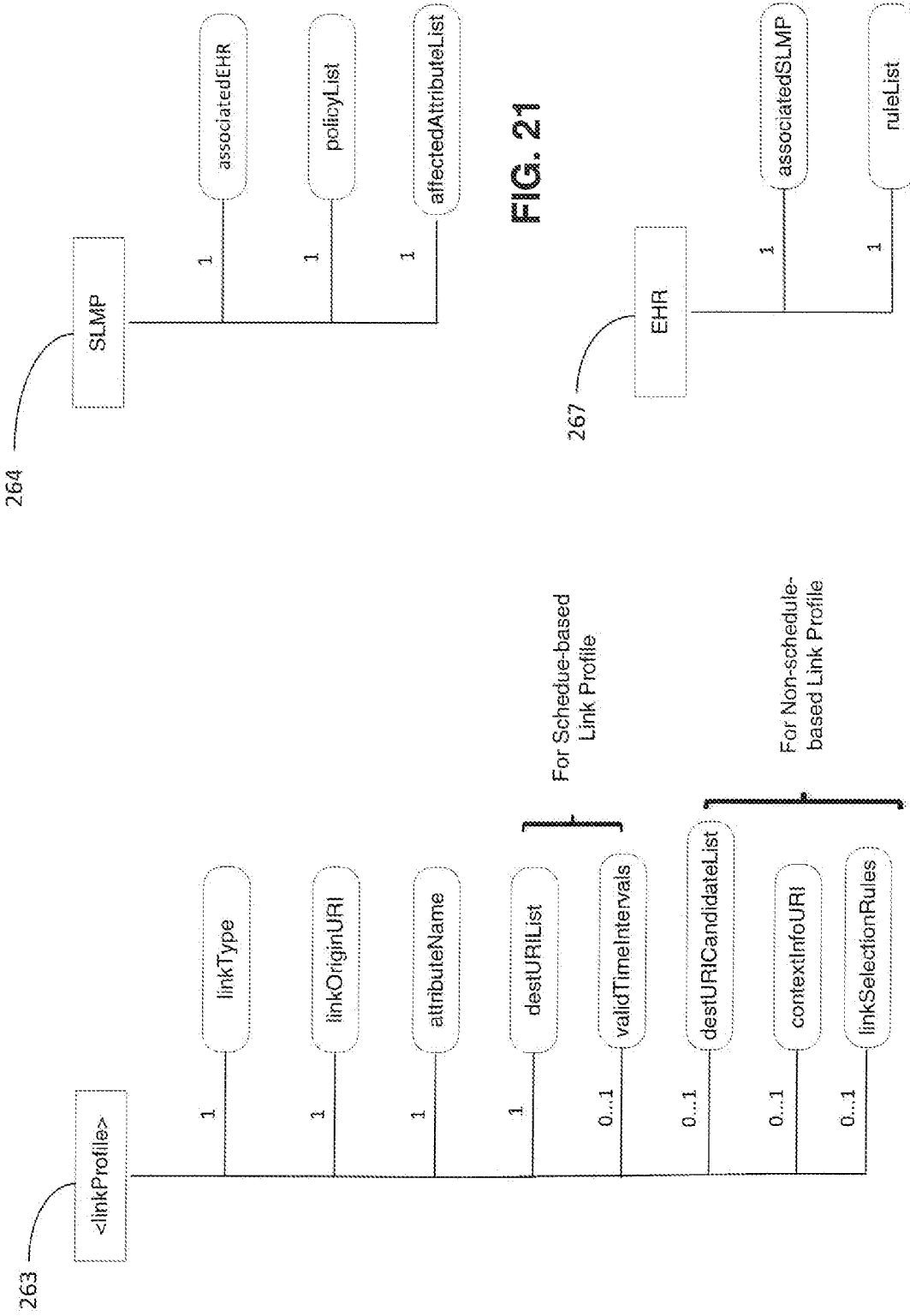

RESOURCE LINK MANAGEMENT AT SERVICE LAYER

CROSS-REFERENCE TO RELATED APPLICATIONS

This application is a National Stage Application filed under 35 U.S.C. 371 of International Application No. PCT/US2015/067773 filed Dec. 29, 2015, which claims the benefit of U.S. Provisional Patent Application No. 62/097,326, filed Dec. 29, 2014, entitled "RESOURCE LINK MANAGEMENT AT SERVICE LAYER," the contents of which are hereby incorporated by reference herein.

BACKGROUND

FIG. 1 illustrates an exemplary protocol stack supporting a service layer 104. As shown in FIG. 1, from a protocol stack perspective, a service layer may be situated above the application protocol layer and provide value added services to applications or to another service layer.

An M2M/IoT service layer is an example service layer targeted towards M2M/IoT type devices and applications. FIG. 2 illustrates an exemplary M2M/IoT service layer deployment within a network. In this example, a service layer instance is a realization of a service layer and a number of service layer instances are deployed on various network nodes (e.g., gateways and servers) for providing value-added services to network applications, device applications as well as to the network nodes themselves. Industry standard bodies (e.g., oneM2M-TS-0001 oneM2M Functional Architecture-V-0.8.0) have been developing M2M/IoT service layers to address the challenges associated with integration of M2M/IoT types of devices and applications into the deployments such as the Internet, cellular, enterprise, and home network. An M2M service layer can provide applications and devices access to a collection of M2M-oriented capabilities supported by the service layer. A few examples of such capabilities include security, charging, data management, device management, discovery, provisioning, and connectivity management. These capabilities may be made available to applications via application program interfaces (APIs) which make use of message formats, resource structures, and resource representations defined by the M2M service layer.

A goal of oneM2M is to develop technical specifications which address the need for a common service layer that can be readily embedded within hardware apparatus and software modules to support a wide variety of devices in the field with M2M application servers worldwide. The oneM2M common service layer supports a set of common service functions (CSFs) (e.g., service capabilities), such as registration 101 and location 103, as shown in FIG. 3. An instantiation of a set of one or more particular types of CSFs is referred to as a common services entity (CSE) which can be hosted on different types of network nodes (e.g., Infrastructure Node (IN), Middle Node (MN), and Application-Specific Node (ASN)). CSEs may be called an IN-CSE, MN-CSE, or ASN-CSE. The AE, CSE, and NSE entities of FIG. 4 are logical entities that are implemented in the form of software, executing on the underlying device or platform, to perform their respective functions in a system. The AE, CSE, and NSE entities are logical entities that may be hosted on a stand-alone computing device (e.g., server) in the network or hosted on an existing entity within the network, such as an M2M gateway, M2M device, M2M server, or the like.

FIG. 4 illustrates a oneM2M service layer resource-oriented architecture (ROA). A resource is a uniquely addressable element in the architecture having a representation that can be manipulated via RESTful methods such as Create, Retrieve, Update, and Delete (CRUD). These resources can be made addressable using universal resource identifiers (URIs). A resource may contain a child resource and an attribute. A child-resource is a resource that has a containment relationship with a parent resource. The parent resource representation contains references to its child resources. The lifetime of a child-resource is limited by the parent's resource lifetime. Each resource supports a set of "attributes" that store information of the resource. Attributes may store one or more URIs that refer to another resource.

Recently, the M2M service component architecture, as shown in FIG. 5, is being developed to consider legacy deployment that is not RESTful based, which is primarily suitable for the infrastructure domain where the CSE is viewed as a set of service components. It largely re-uses the service layer architectural shown in FIG. 4, but within the service layer, it contains various M2M services and multiple services can be grouped into service components. In addition to existing reference points, the CSE in FIG. 5 includes an inter-service reference point Msc. Communication between M2M service components (passing over the Msc reference point) may utilize a web service approach, which is a popular technology for building service-oriented architecture (SoA)-based systems.

SUMMARY

Disclosed herein is a link management service (LMS) that may dynamically configure one or more link-enabling attributes based on a link profile. There may be multiple types of architectures that support the LMS, such as an independent link management and integrated link management.

In an example, a device comprises a processor and a memory coupled with the processor. The memory comprises executable instructions that when executed by the processor cause the processor to effectuate operations that include receiving a first profile, the first profile comprising instructions that define configuring a link of an attribute, the link of the attribute directed to a first resource; receiving an indication to manage the attribute; and automatically determining the configuration of the attribute based on the first profile.

In another example, a method comprises receiving a first link profile, the first link profile comprising instructions that define configuring a use of a link of a first resource, the link of the first resource directed to a second resource; receiving an indication to manage the link; and automatically managing the use of the link based on the first link profile.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein:

FIG. 20 illustrates an exemplary RESTful resource-based interface of <linkProfile>;

FIG. 21 illustrates an exemplary RESTful resource-based interface of <SLMP>;

FIG. 22 illustrates an exemplary RESTful resource-based interface of <EHR>;

DETAILED DESCRIPTION

Figure 1:
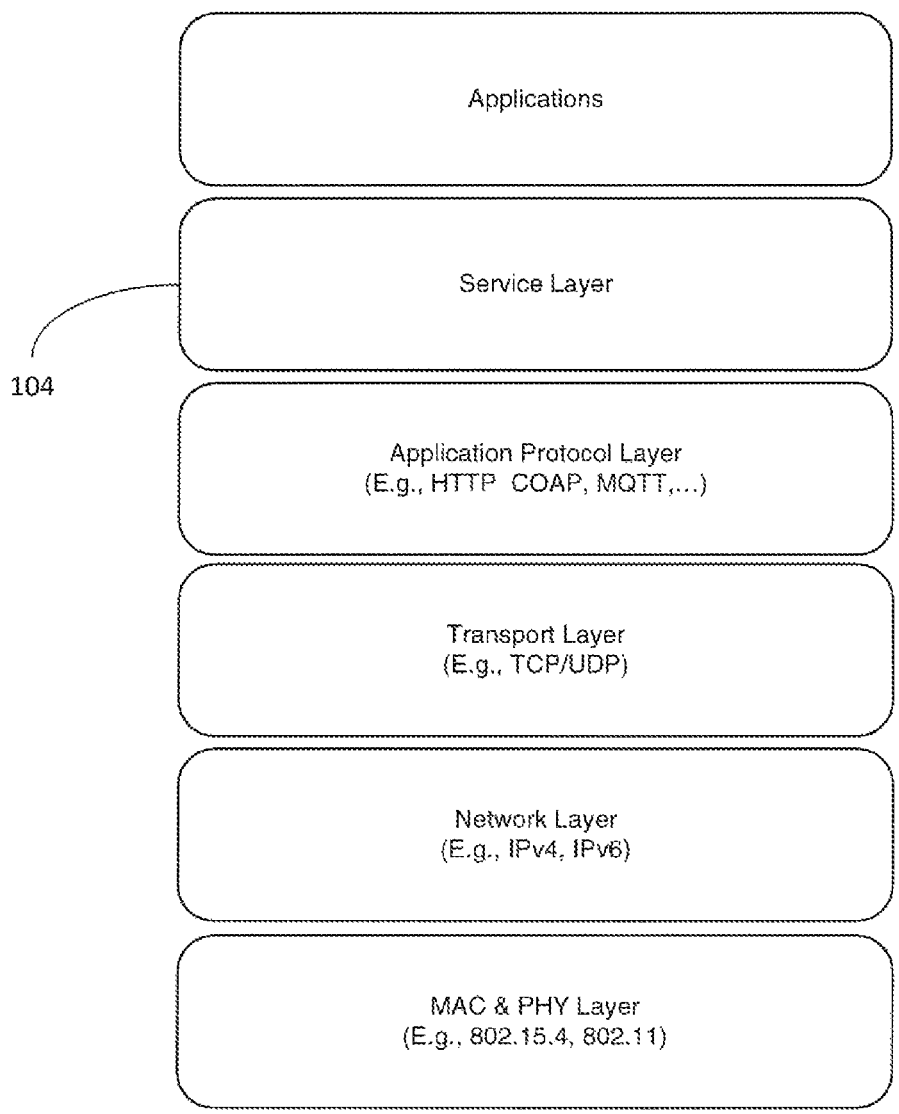
FIG. 1 illustrates an exemplary protocol stack supporting a service layer.
Figure 2:
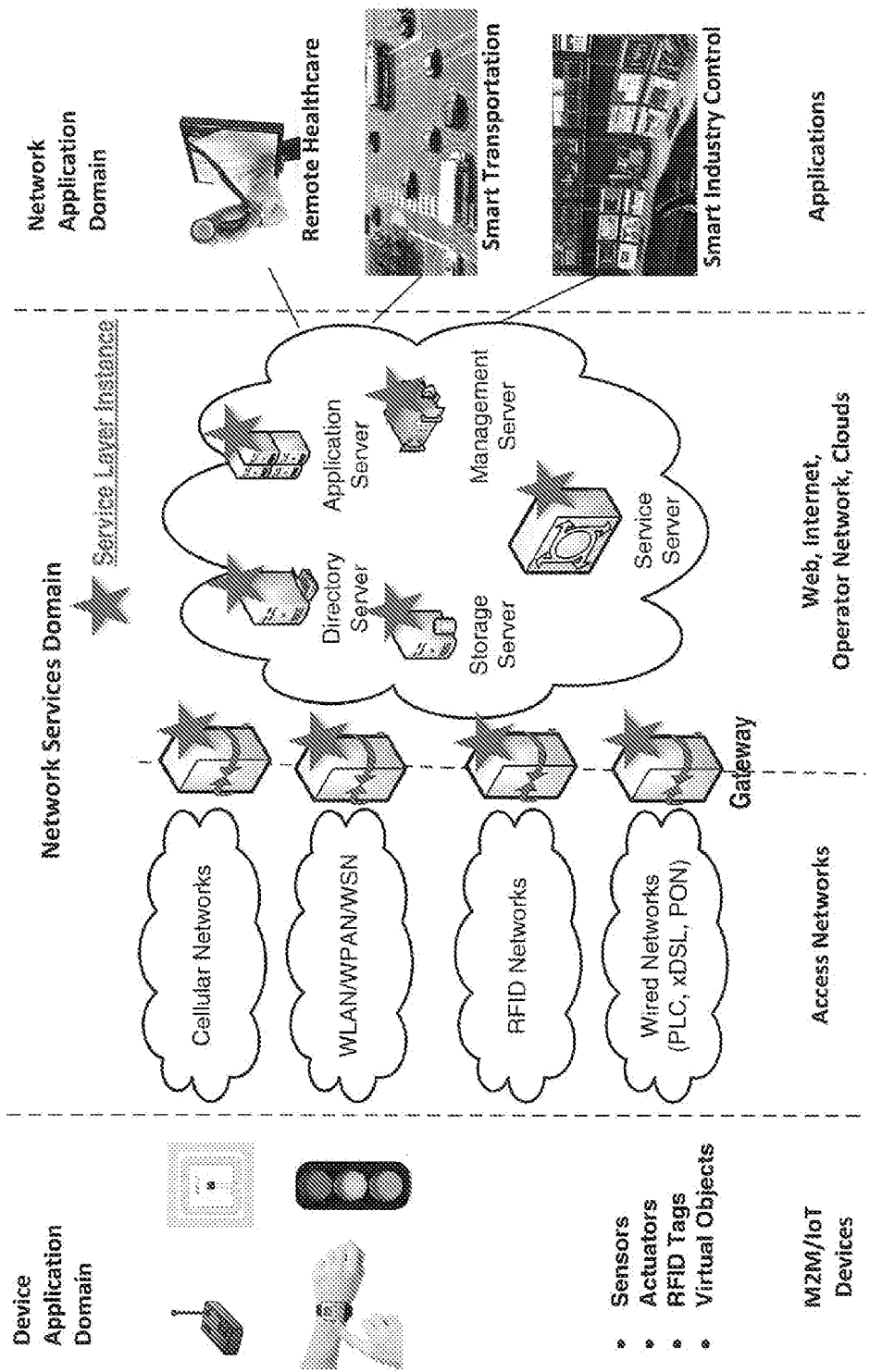
FIG. 2 illustrates an exemplary M2M/IoT service layer deployment within a network.
Figure 3:
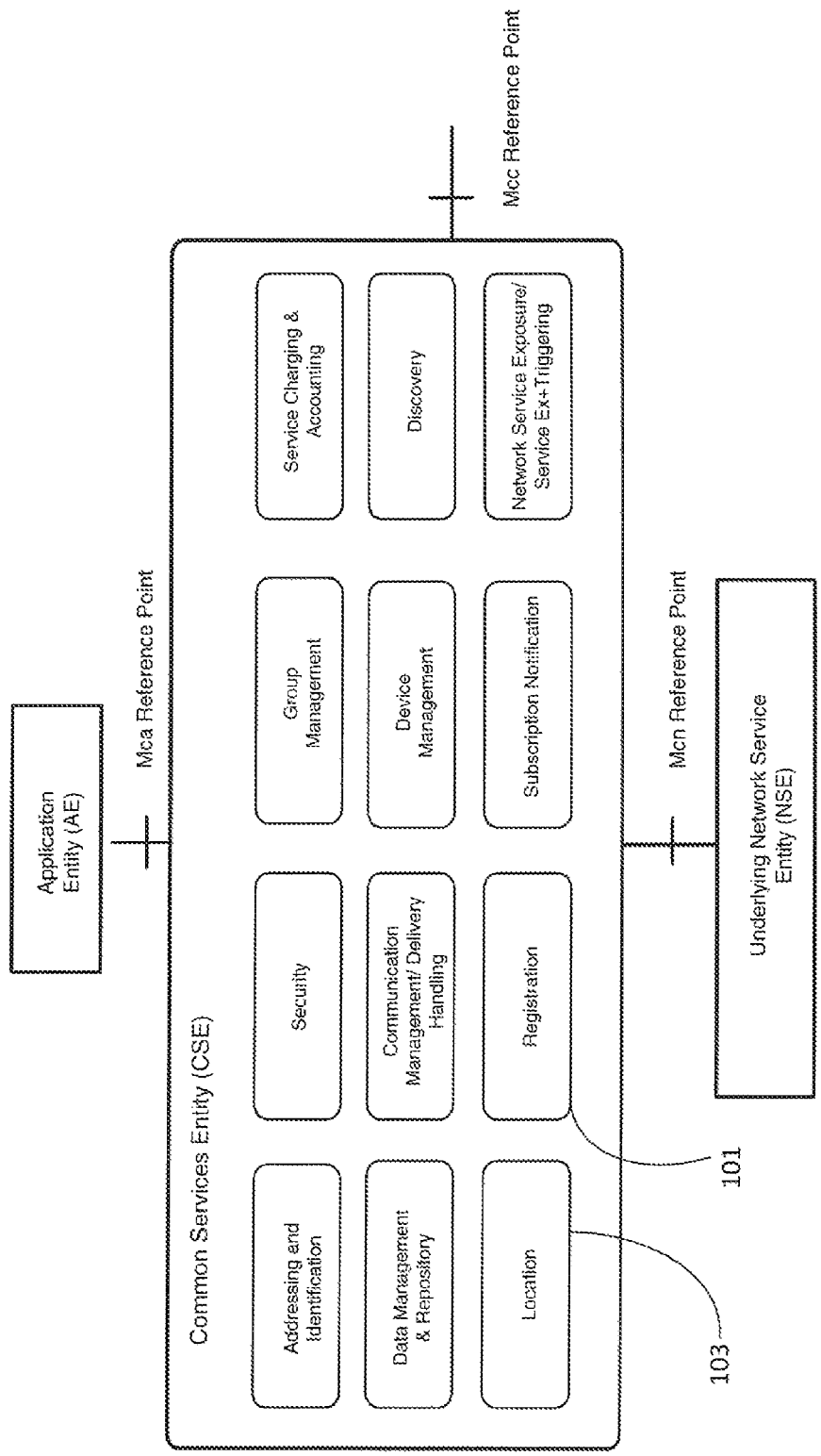
FIG. 3 illustrates an exemplary common services functions (CSFs) in oneM2M service layer.
Figure 4:
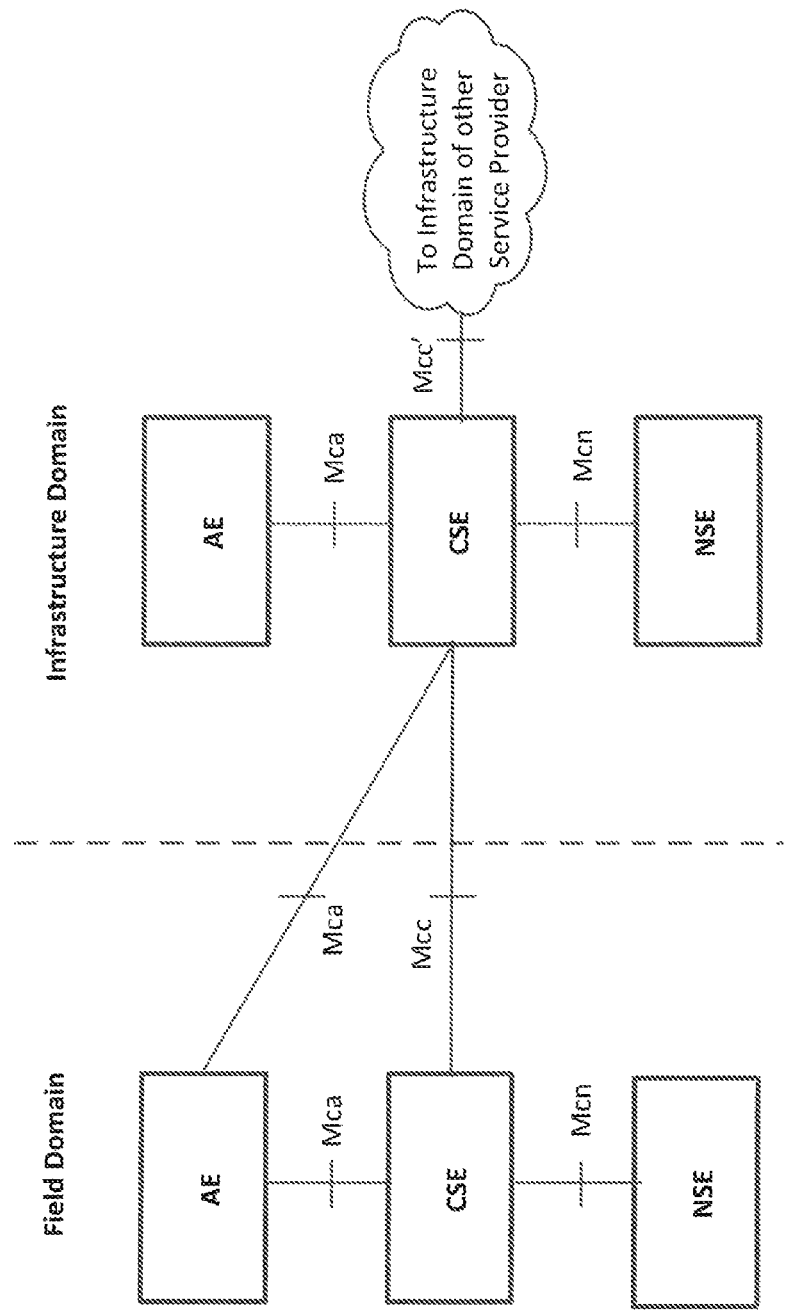
FIG. 4 illustrates an exemplary oneM2M service layer resource-oriented architecture.
Figure 5:
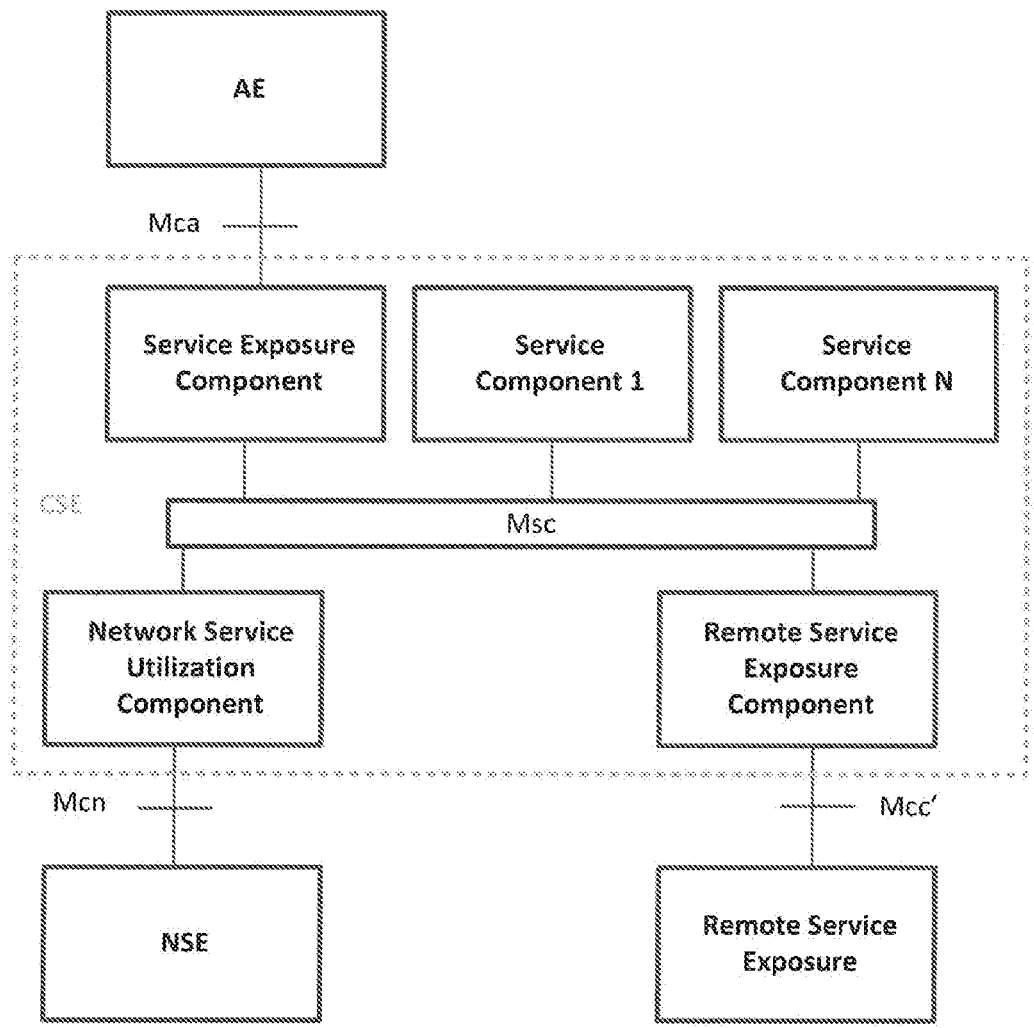
FIG. 5 illustrates an exemplary oneM2M services component architecture.
Figure 6:
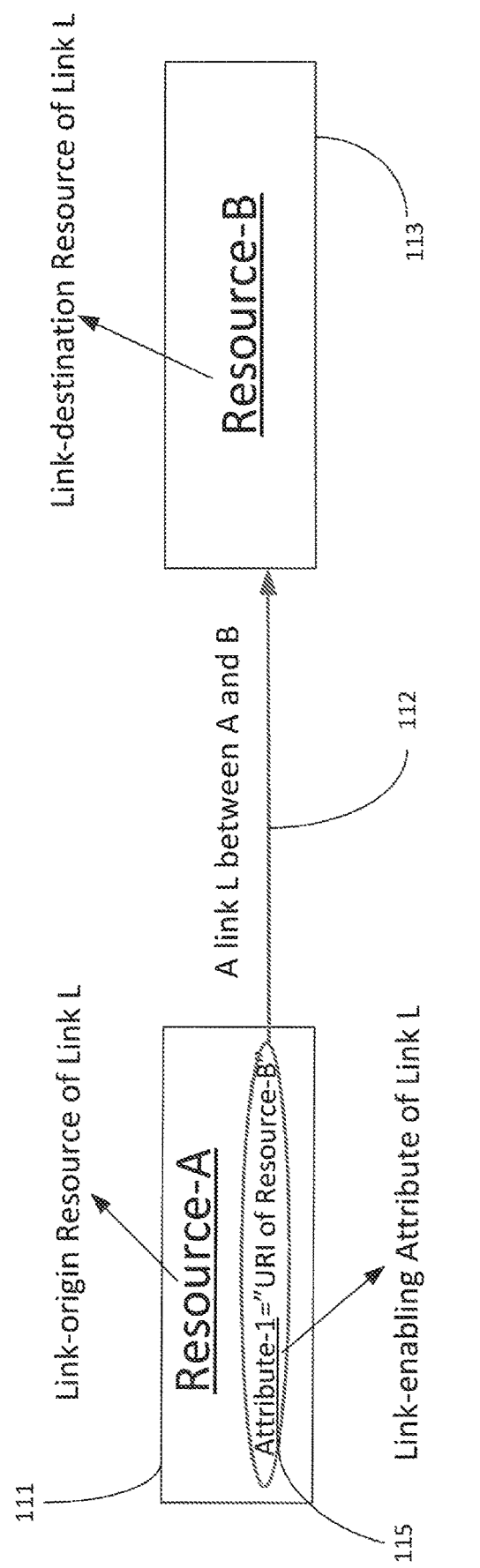
FIG. 6 illustrates an exemplary link built between two resources via an attribute.

In oneM2M-TS-0001 oneM2M Functional Architecture-V-0.8.0, it indicates that links can be built between resources and a resource can have one or more links towards another resource. The link considered herein may be built between two resources when storing a URI in an attribute of one resource, which is directing to another resource. For example, a link can be built from Resource-A to Resource-B by assigning the URI of Resource-B to an attribute (e.g., Attribute-1) of Resource-A. A link management task can be built by an entity through submitting a link profile to LMS. A link management task may refer to an LMS conducting configurations on one or more attributes based on its (their shared) link profile. A task may be deleted from LMS if the corresponding link profile is deleted from LMS (by an entity). FIG. 6 illustrates an exemplary link between two resources. As shown in FIG. 6, logical link 112 is built from Resource-A 111 to Resource-B 113 by assigning a URI of Resource-B 113 to an attribute (Attribute-1 115) of Resource-A 111. It is termed herein Resource-A 111 is a link-origin resource, Resource-B 113 is a link-destination resource, and Attribute-1 115 is a link-enabling resource of logical link 112 (a representation of the URI in Attribute-1 115). As supported by the example with regard to FIG. 6, a link-origin resource is a resource (e.g., Resource-A 111) that stores an attribute or the like (e.g., Attribute-1 115) that includes a URI that directs to another resource (e.g., Resource-B 113). A link-enabling attribute is an attribute or the like (e.g., attribute-1 115) that stores the URI that links to a resource (e.g., Resource-B 113) and is located within another resource (e.g., Resource-A 111). Lastly, a link-destination resource is a resource (e.g., Resource-B 113) that is the destination of a URI that is located within a resource (e.g., Resource-A 111).

Figure 7A:
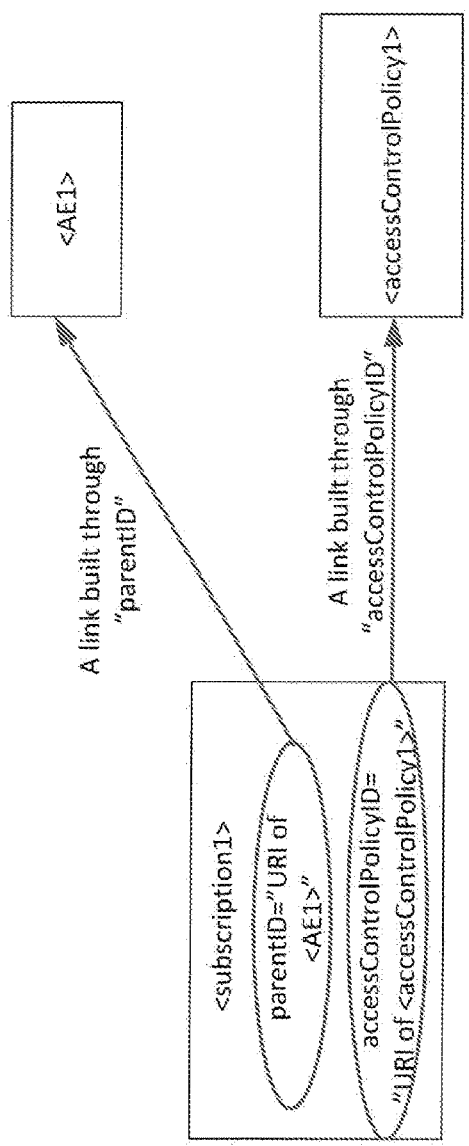
FIG. 7A is an exemplary illustration of multiple links originating from a <subscription1> resource to <AE1> and <accessControlPolicy1> resources.
Figure 7B:
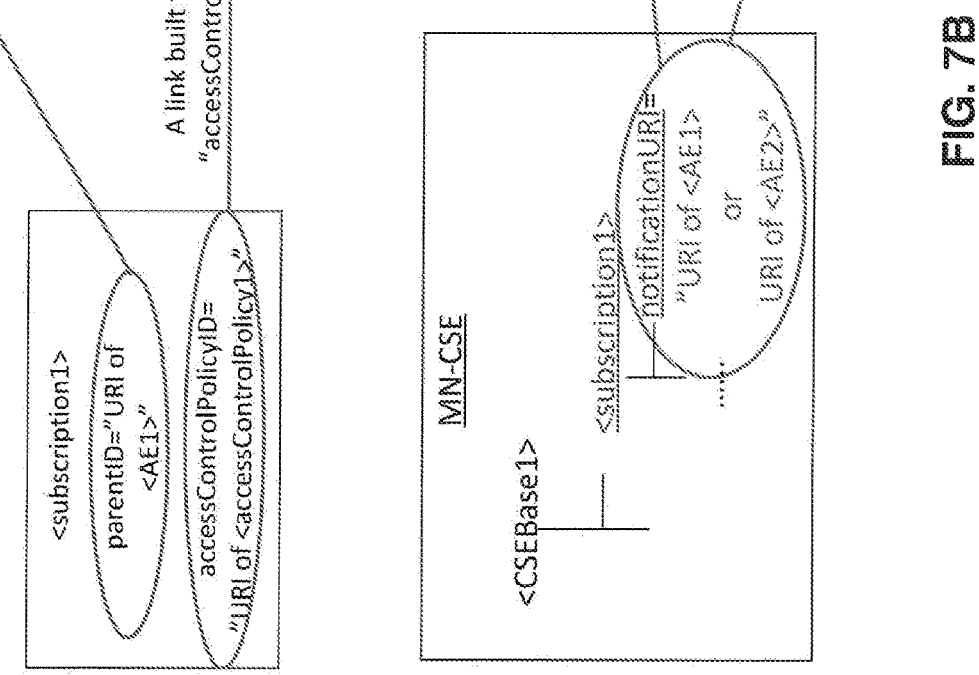
FIG. 7B is an exemplary illustration of multiple links originating from a <subscription1> resource to <AE1> and <AE2>.

Table 1 provides exemplary attributes from the oneM2M specification that can be used for building links. FIG. 7A illustrates an example with link-enabling attributes taken from Table 1. As shown in FIG. 7A, two attributes (e.g., "parentID" and "accessControlPolicyID") of a <subscription1> resource have been set with the URIs of an <AE1> and an <accessControlPolicy1> resources respectively. Two links are built between <subscription1> and the two resources (e.g., <AE1> and <accessControlPolicy1>) accordingly. FIG. 7B is similar to FIG. 7A, and will be discussed in more detail below with regard to non-scheduled-based link profile link profiles.

TABLE 1

Link-enabling Attributes in oneM2M

| Link-enabling Attribute | Link-origin Resource | Link-destination Resource |
|---|---|---|
| Attribute named "accessControlPolicyID" | Several (node, application, remoteCSE, container) | accessControlP |
| Attribute named "nodeID" OR Child resource of type "node" | CSEBase | node |
| Attribute named "hostedCSEID" OR parent resource of type CSEBase | node | CSEBase or remoteCSE |
| Attribute named "parentID" | a child resource of any resourceType | a parent resource of any resourceType |
| Child resource of a specific type | a parent resource of any resourceType | a child resource of any resourceType |

Disclosed is a link management service (LMS) that may dynamically configure one or more link-enabling attributes based on a link profile. There may be multiple types of architectures that support the LMS, such as an independent link management and integrated link management. Independent link management and integrated link management are discussed in more detail herein.

Figure 8:
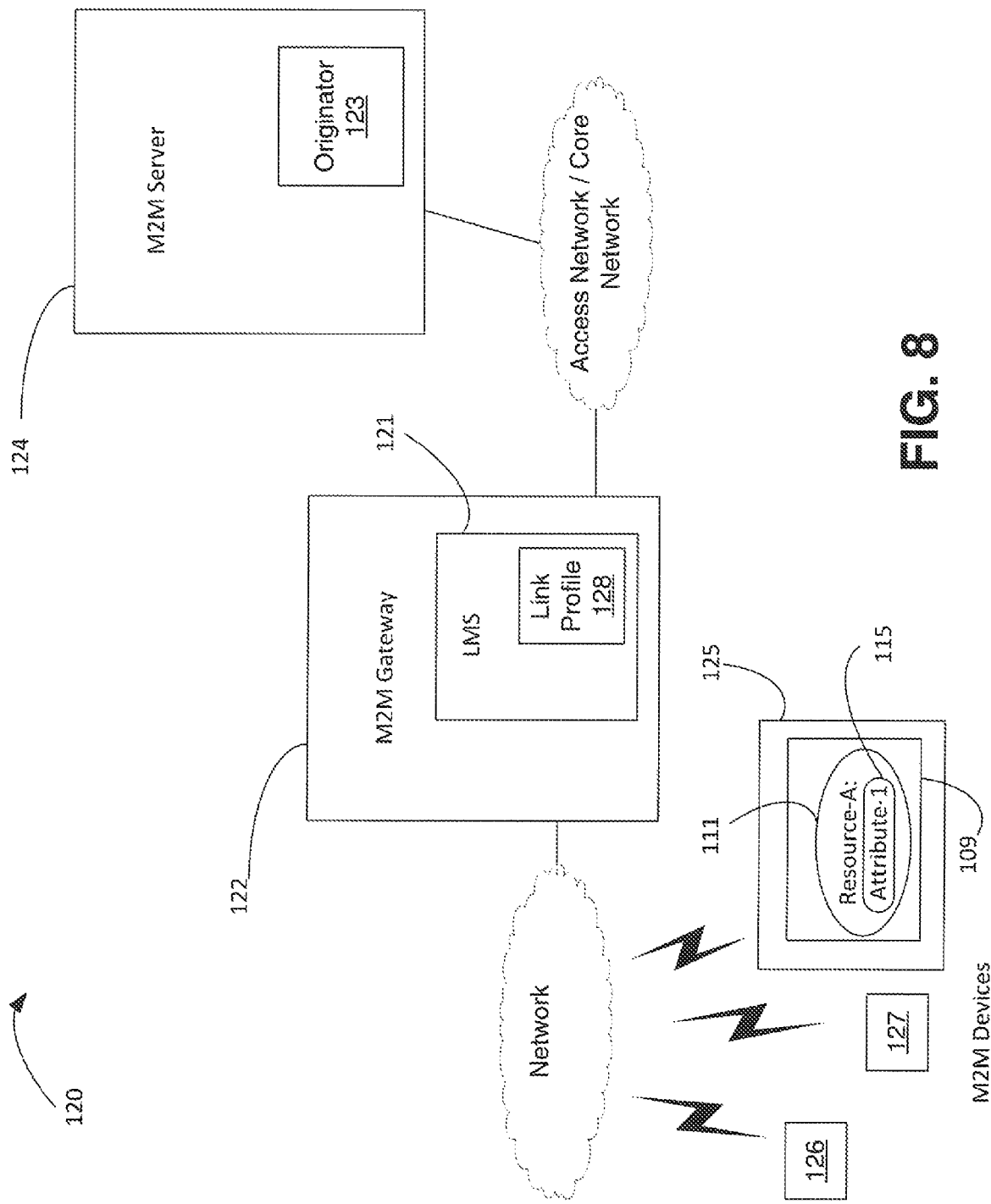
FIG. 8 illustrates an exemplary system that implements LMS.

FIG. 8 illustrates an exemplary system that implements LMS. M2M Server 124 may include an originator 123 associated with link management. Originator 123 may be located within M2M server 124 and communicatively connected to M2M gateway 122, M2M device 125, M2M device 126, and M2M device 127, among other devices. Originator 123 may be an application (e.g., application entity—AE) for a service. Originator 123 can initiate requests for: 1) submitting a link profile (e.g., link profile 128) to LMS 121, 2) updating the link profile, or 3) for deleting or de-registering the link profile from LMS 121. In summary, originator 123 initializes a link management related request. The originator 123 should have the permissions to initiate the link management related request. Alternatively, originator 123 may be the entity which creates the link-origin resource (e.g., Resource-A 111) that the link-enabling attribute (e.g., Attribute-1 115) belongs to, because it is the owner of this resource. Originator 123 may be any number of entities or devices (e.g., AE, common service entity—CSE, network service entity—NSE, M2M server, M2M gateway, M2M device, etc.) that may initiate link management on an attribute.

M2M gateway 122 can include LMS 121. LMS 121 may include link profile 128 and be communicatively connected with originator 123 and M2M device 125, M2M device 126, and M2M device 127, among other devices. LMS 121 is responsible for conducting link management for the Attribute-1 115 based on link profile 128 submitted by originator 123. LMS 121 may reside on the link-hosting CSE or another CSE. The link-hosting CSE is where the link-origin resource (e.g., Resource-A 111) as well as its link-enabling attribute (e.g., attribute-1 115) are hosted. LMS 121 serves as an executor to conduct link configurations based on instructions included in link profile 128, which may be updated/deleted as well through certain procedures as defined herein. M2M device 125, M2M device 126, and M2M device 127 are communicatively connected with M2M gateway 122 and its subcomponents and may be also be communicatively connected with M2M server 124 and its subcomponents. Each M2M device may have link-origin resource (e.g., Resource-A 111) with a link enabling attribute (e.g., attribute-1 115), such as found in M2M device 125.

With continued reference to FIG. 8, below is an example of using LMS with regard to a lawn care service. For example, M2M device 126, M2M device 127, and M2M device 125 may be sensors such as a wind sensor, a humidity sensor, or a temperature sensor. There may be a <subscription> resource (e.g., Resource-A 111) hosted by each M2M device (125, 126, and 127) for sending notification regarding the sensory data. Link profiles (e.g., link profile 128) may be generated for a "notification URI" attribute (e.g., attribute-1 115) of <subscription> resources hosted on the M2M devices (125, 126, and 127). The link profiles may have information that may help customize when, how, or which notifications are needed for lawn care scheduling done by the lawn care service (e.g., Originator 123). These link profiles are submitted to LMS 121 and LMS 121 manages the links based on the link profiles.

Figure 9:
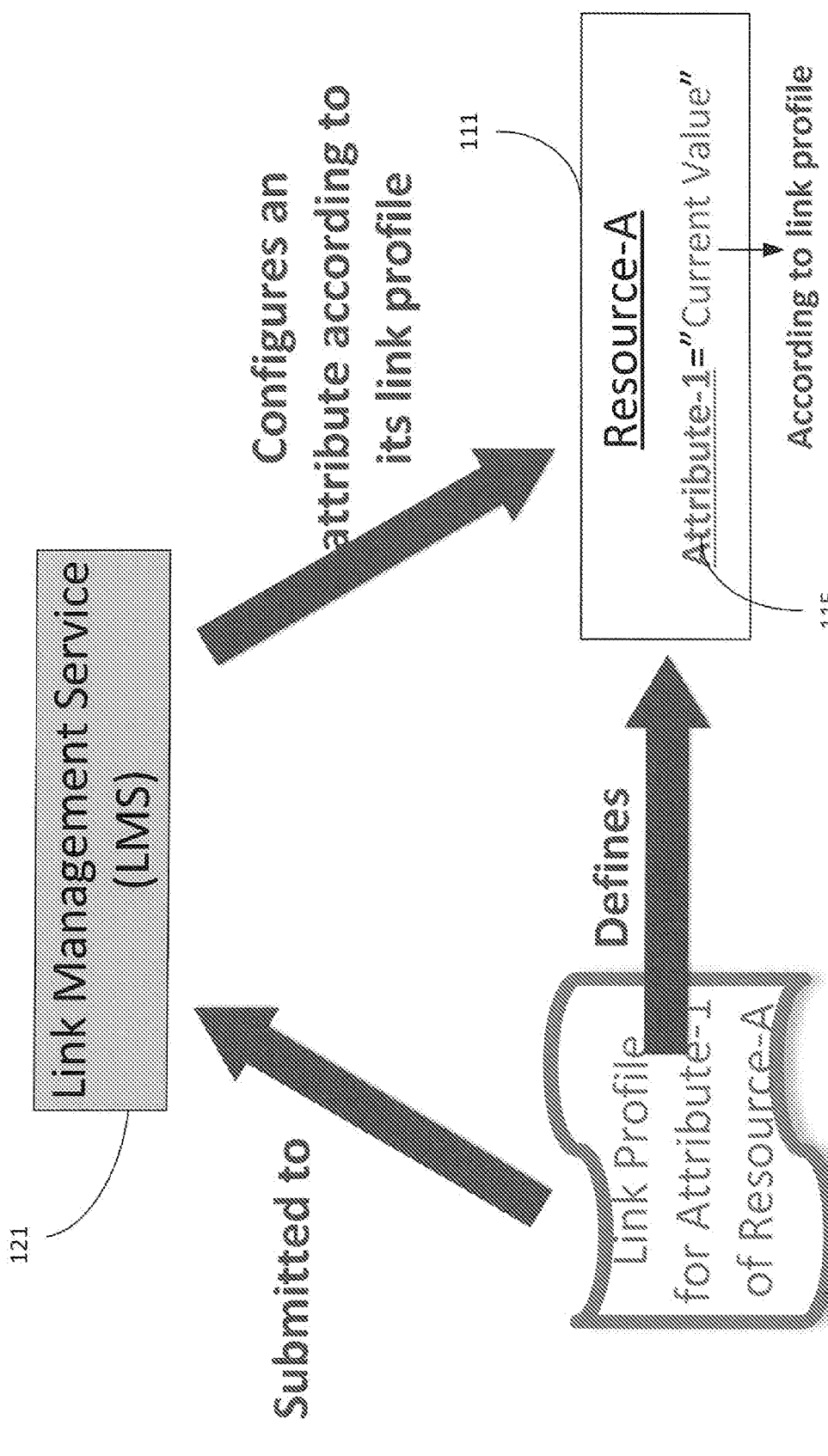
FIG. 9 illustrates an exemplary architectural framework of independent link management.
Figure 10:
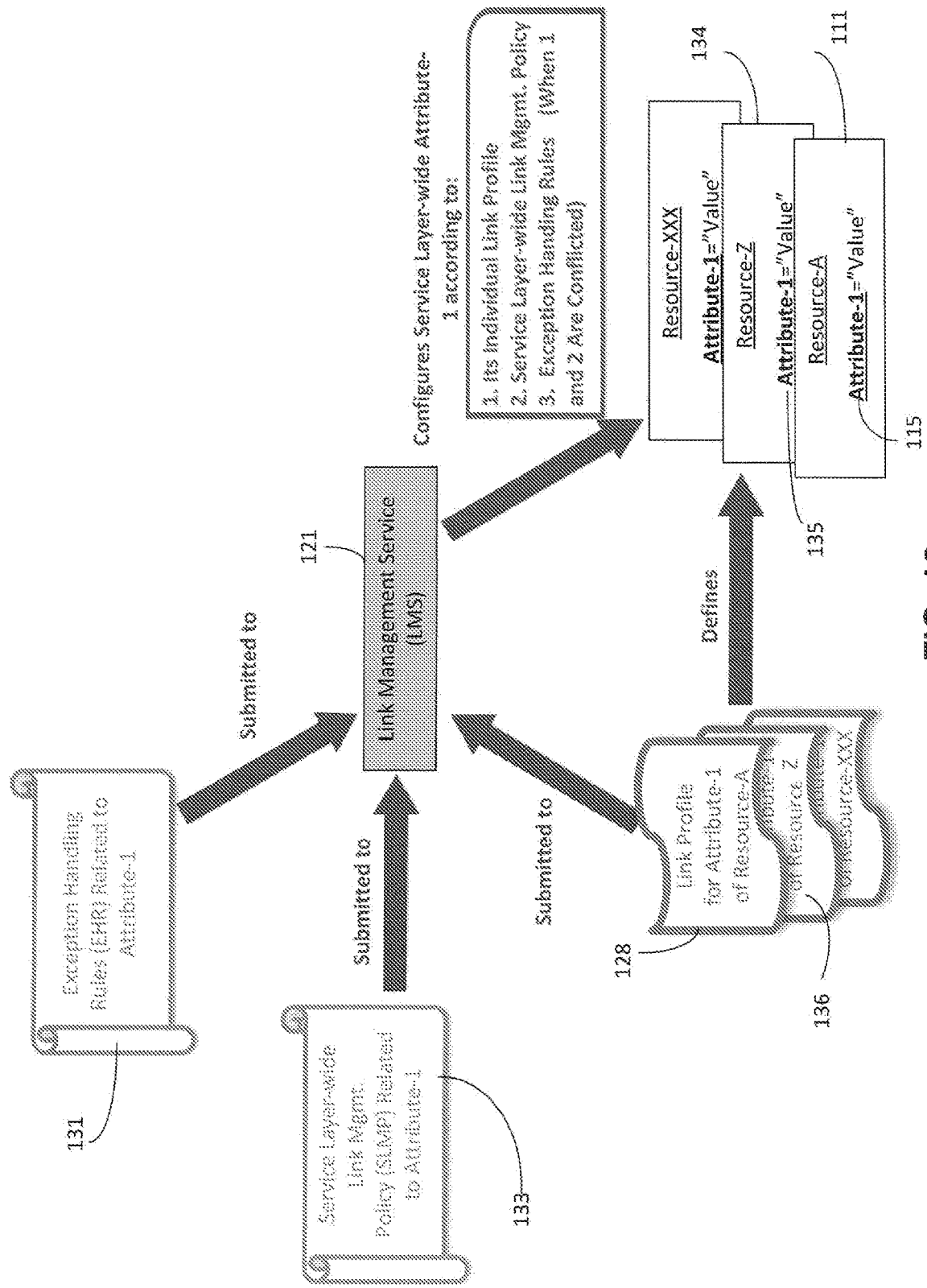
FIG. 10 illustrates an exemplary architectural framework of integrated link management.

FIG. 9 and FIG. 10 illustrate architectural frameworks of link management. FIG. 9 illustrates independent link management. In summary, independent link management executes link management based on link profiles (e.g., link profile 128), but does not take into consideration conflicts between link profiles. As shown in FIG. 9, link profile 128 is submitted to LMS 121. In addition link profile 128 defines the attribute-1 115 of Resource-A 111. LMS 121 configures Attribute-1 115 based on submitted link profile 128.

LMS also has the capability to conduct integrated link configurations on multiple link-enabling attributes of different resources. The integrated link management (FIG. 10) provides that configurations on those multiple link-enabling attributes could be affected and co-related with each other, and therefore the configurations on link-enabling attributes need to not only refer to their associated link profiles, but also be compliant to certain system-wide policies, if they exist. For example, LMS could be responsible for updating the parentID attribute of all the resources when they are migrated to another CSE. In addition, it is worth noting that LMS could follow a customized policy submitted to it, or a policy compliant to existing or future standard specification.

Figure 11:
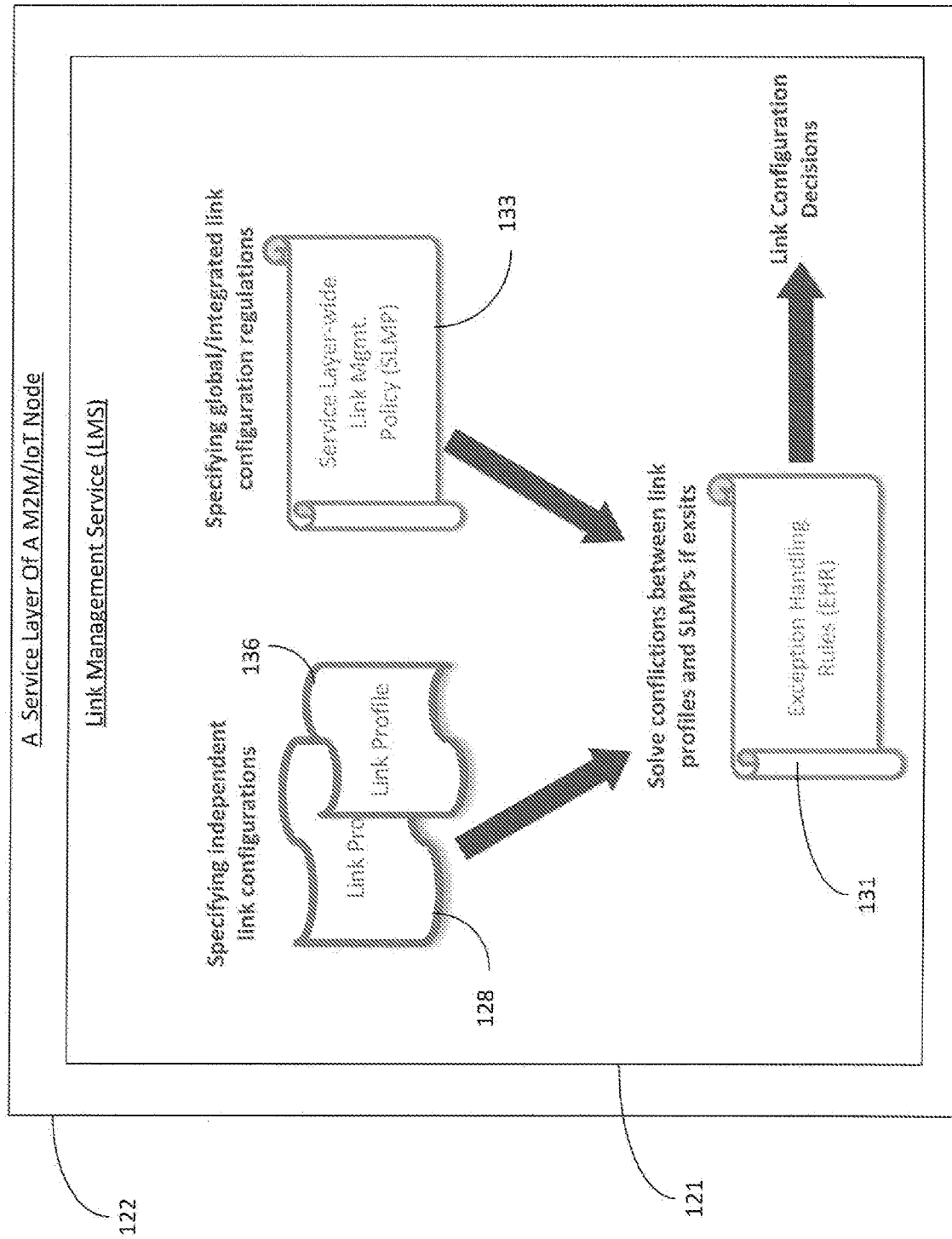
FIG. 11 illustrates an exemplary architectural framework of integrated link management on a single M2M/IoT node.

FIG. 10 illustrates an exemplary enhanced or integrated framework for link management. In this example, the integrated framework includes exception handling rules (EHR) 131, service layer-wide link management policy (SLMP) 133, multiple link profiles (e.g., link profile 128 and link profile 136), LMS 121, Resource-Z 134 with attribute-1 135, and Resource-A 111 with attribute-1 115. FIG. 11 illustrates the concept shown in FIG. 10 as confined within in a service layer of a M2M or IoT node (e.g., M2M gateway 122). The different components of the link management framework are discussed in more detail below. With regard to LMS 121, LMS 121 is responsible for managing different link-enabling attributes according to their link profiles. For example, at LMS 121, after link profiles are submitted, specific link management tasks may be built that corresponds to each of the submitted link profiles. For example, with regard to building a link management task at LMS 121, a profile may include how to configure an attribute, such as a notificationURI attribute of a <subscription> resource for informing different apps about the latest temperature. The configuration instruction to be followed may include that the notificationURI is set to URI of WeatherReport App during 9 am-3 pm, and will be set to URI of TripPlanning App during 3 pm-11 pm. The LMS may initialize a corresponding device to execute operations to conduct the link previously mentioned configurations by following the above-mentioned instructions specified in that link profile.

Typically, a link profile 128 for the attribute-1 115 of Resource-A 111 can be generated and submitted to LMS 121, if Resource-A 111 and attribute-1 115 are already created. Afterwards, instead of requiring other entities to configure the values of the created link-enabling attributes (e.g., attribute-1 115) by themselves, LMS 121 can configure the created link-enabling attributes on behalf of those entities based on the specification included in the link profiles (e.g., link profile 128 and link profile 136), which may be generated by certain entities based on their needs as mentioned earlier. Other entities could be any of CSEs or application-related software instance that uses LMS for dynamic link management operations based on their needs. For example, still using the above WeatherReport App example, a software instance (other entity) responsible for managing temperature devices can build a link profile for a "notificationURI attribute of a specific <subscription> resource in order to inform different apps (e.g., WeatherReport App or TripPlanning App) about the latest updates from a temperature sensor. If LMS 121 and attribute-1 115 (a link-enabling attribute to be managed) are co-located (for example, Resource-A 111 is on a CSE which intrinsically supports LMS), then attribute-1 115 will be configured inside the CSE, which leads to less communication overhead. In addition, LMS 121 can be deployed on any nodes (e.g., ASN-CSE, MN-CSE, or IN-CSE), as long as there are computing resources. Attribute-1 115 stores the current valid value, which is dynamically configured by LMS 121 according to its link profile 128. How a link is configured by LMS 121 may be hidden, unless there is permission for retrieving the value of attribute-1 115.

SLMP 133 is a set of regulations or constraints to which the link configurations on related attributes (e.g., attribute-1 115 and attribute-1 135) need to also be compliant, in addition to their link profiles. SLMP is a set of global regulations and constraints about how the link configurations on different attributes can be affected with each other, in addition to the link profiles used for conducting independent configurations on those attributes. Similar to link profile 128, SLMP 133 can also be submitted to LMS 121 by an entity who is allowed to do so. An example with regard to SLMP 133 may be related to "parentID" of oneM2M. SLMP 133 may contain a rule that a certain set of resources (e.g., Resource-Z 134) are not allowed to share the same parents with another set of resources (e.g., Resource-A 111) due to some application specific security reason.

With continued reference to FIG. 11 and integrated link management, EHR 131 has rules that are used to deal with exceptions in link configurations. For a given SLMP, there may be a corresponding set of exception handling rules, which could also be submitted to LMS 121 by an entity who is allowed to do so. When LMS 121 configures certain link-enabling attributes (e.g., attribute-1 115 or attribute-1 135), LMS 121 considers not only the related link profiles (e.g., link profile 128 and link profile 136), but also the involved SLMPs, and apply EHRs if any conflict exists. EHR is a set of rules used when the independent configurations included in link profiles have conflicts with a SLMP.

Sometimes a preferred implementation may have the link profiles of the link-enabling attributes of all or most of the resources hosted by a CSE be submitted to the same LMS (e.g., LMS 121), and such an LMS will also hold a set of related SLMPs and EHRs.

As discussed, link profile can be generated by the entity which creates the link-origin resource that this link-enabling attribute belongs to and be submitted to LMS to initialize a link management task. Alternatively, a link profile can also be used for configuring more than one link-enabling attributes in the sense that a link profile could be associated with a number of attributes and all the link configurations (specified by the link profile) on those attributes will be like group operations. In order to simplify presentation there is a focus on the basic case when introducing the details in the sections herein.

Discussed below are schedule-based link profiles and non-scheduled based link profiles. The two types of link profiles discussed below are examples. Various link profiles can be created (e.g., event or condition based link profiles), depending on different application scenarios. Table 2 lists common items for the different types of link profiles. As further described in Table 2, there may be a profileType (e.g., 1=scheduled based profile, 2=non-scheduled based profile), link OriginURI (e.g., URI for attribute-1 115), and an attributeName for each link profile type.

TABLE 2

Common Items of a Link Profile

| Common Item | Multi-plicity | Description |
|---|---|---|
| profileType | 1 | Schedule-based link profile (when profileType = 1) is able to enable the link-enabling attribute to have schedule-related feature, and non-schedule-based link profile (when profileType = 2) is able to enable the link-enabling attribute to have non-schedule and context-aware related feature. |
| linkOriginURI | 1 | The "linkOriginURI" is to store the URI of the link-origin resource that the associated link-enabling attributes belong to. In the basic scenario (as considered in this section), it will be used for addressing a resource holding the associated link-enabling attribute(s) when needed to configure them. Alternatively, the "linkOriginURI" may also be allowed to store a list of URIs of link-origin resources. |
| attributeName | 1 | The "attributeName" is to store the name of the associated link-enabling attribute of this link profile. In general, with "linkOriginURI" and "attributeName", LMS knows where to configure the associated attributes associated with this link profile. Similar to "linkOriginURI", alternatively, the "attributeName" may also be allowed to store a list of link-enabling attributes to be managed. In summary, a link profile could have different application scopes depending on how the "linkOriginURI" and "attributeName" are set. |

With regard to schedule-based link profiles, if a link-enabling attribute is associated with a schedule-based link profile, the links built through this attribute may be valid during specific time intervals. Schedule-based link profiles may be useful for supporting scenarios where sleepy nodes (e.g., devices that may regularly go into a sleep type mode) exist. Table 3 provides example items that include destURIList and validTimeIntervals for schedule-based link profiles.

TABLE 3

Specific Items of A Schedule-based Link Profile

| Item | Multi-plicity | Description |
|---|---|---|
| destURIList | 1 | The "destURIList" stores the URI of a link-destination resource. Alternatively, the "destURIList" may also store a list of URIs of link-destination resources such that this link profile is used for group operation on all the URIs held by this destURIList. |
| validTimeIntervals | 1 | The "validTimeIntervals" is to indicate when the link is valid, e.g., when to assign the URI value held by destURIList to the related link-enabling attribute(s). For the time periods outside those time intervals, the attribute(s) will be set with e.g., a null value (so that the link is temporally disabled) or other system-recognized value (depending on implementation). |

With regard to non-schedule-based link profiles, if a link-enabling attribute is associated with a non-schedule-based link profile, the links built through this attribute may be configured based on real-time context in the system and the related rules defined in its link profile.

For further perspective with regard to non-scheduled-based link profiles which may consider context information, a scenario with reference to FIG. 7B is discussed. One of the scenarios for this use case is shown in FIG. 7B: a <subscription> resource (e.g., <subscription1>), which is a child resource of <CSEBase1> hosted on a MN-CSE node. In particular, the notificationURI attribute could either hold the URI of <AE2> (hosted by ASN-CSE1) or that of <AE3> (hosted by ASN-CSE2) because both of them are interested in <CSEBase1>. However, how to set notificationURI could be based on the context information (e.g., near real-time conditions) or any user-defined or application-specific rules. For example, <AE1> may be the primary notification receiver (e.g., assigning <AE1>'s URI to the notification-URI attribute) and the notificationURI may dynamically be set to <AE2>'s URI whenever <AE1> becomes unreachable.

Conventional service layer implementations do not provide mechanisms for dynamically configuring via the aforementioned link-enabling attributes (e.g., the notificationURI attribute in FIG. 7B), other than through the explicit update operations. In particular the conventional implementations, if the initiator of those update operations is far from a CSE (e.g., MN-CSE in FIG. 7B), which hosts the resource and corresponding attributes to be managed, such frequent update operations may cause considerable communication overhead.

With regard to oneM2M, conventional implementations of <subscription> are "heavy" in an attempt to support advanced features. For example, notificationSchedule child resource and pendingNotification attribute are used to enable <subscription> to have some intelligence for notifications. Defining of more and more new attributes in the conventional manner for new features (such as dynamically configuring notificationURI as mentioned earlier), the resource may become even heavier. The disclosed link management service allows for a generally more scalable implementation.

Table 4 provides example items that include destURICandidateList, contextInfoURI, and linkSelectionRules for non-schedule-based link profiles.

TABLE 4

Specific Items of Non-schedule Link Profile

| Item | Multi-plicity | Description |
|---|---|---|
| destURICandidateList | 1 | The "destURICandidateList" stores the candidate URIs that could be assigned to the associated attribute(s) of this link profile. Different from "destURIList" shown in schedule-based link profile, which is used for group link configuration operation on the URIs held by destURIList, the "destURICandidateList" holds the candidate URIs, subset of which will be assigned to the attribute under different conditions depending on the rules specified in "linkSelectionRules" and the real-time context obtained from the entity specified in "contextInfoURI". |
| contextInfoURI | 1 | The "contextInfoURI" stores where to collect real-time context information. How to collect those real-time contexts or other information depends on different application scenarios. |
| linkSelectionRules | 1 | The "linkSelectionRules" stores the configuration rules regarding when and which URIs included in "destURICandidateList" need to be assigned to the associated attribute(s) of this link profile. To do so, LMS collects the real-time context and compares it with the rules specified in this link profile. The rules could be described in an "If-Then" manner. For example, one rule could be: if the network is congested, then the associated attribute will be set with the URI of Resource-A 111, otherwise, it will be set with the URI of Resource-Z 134. |

Figure 28A:
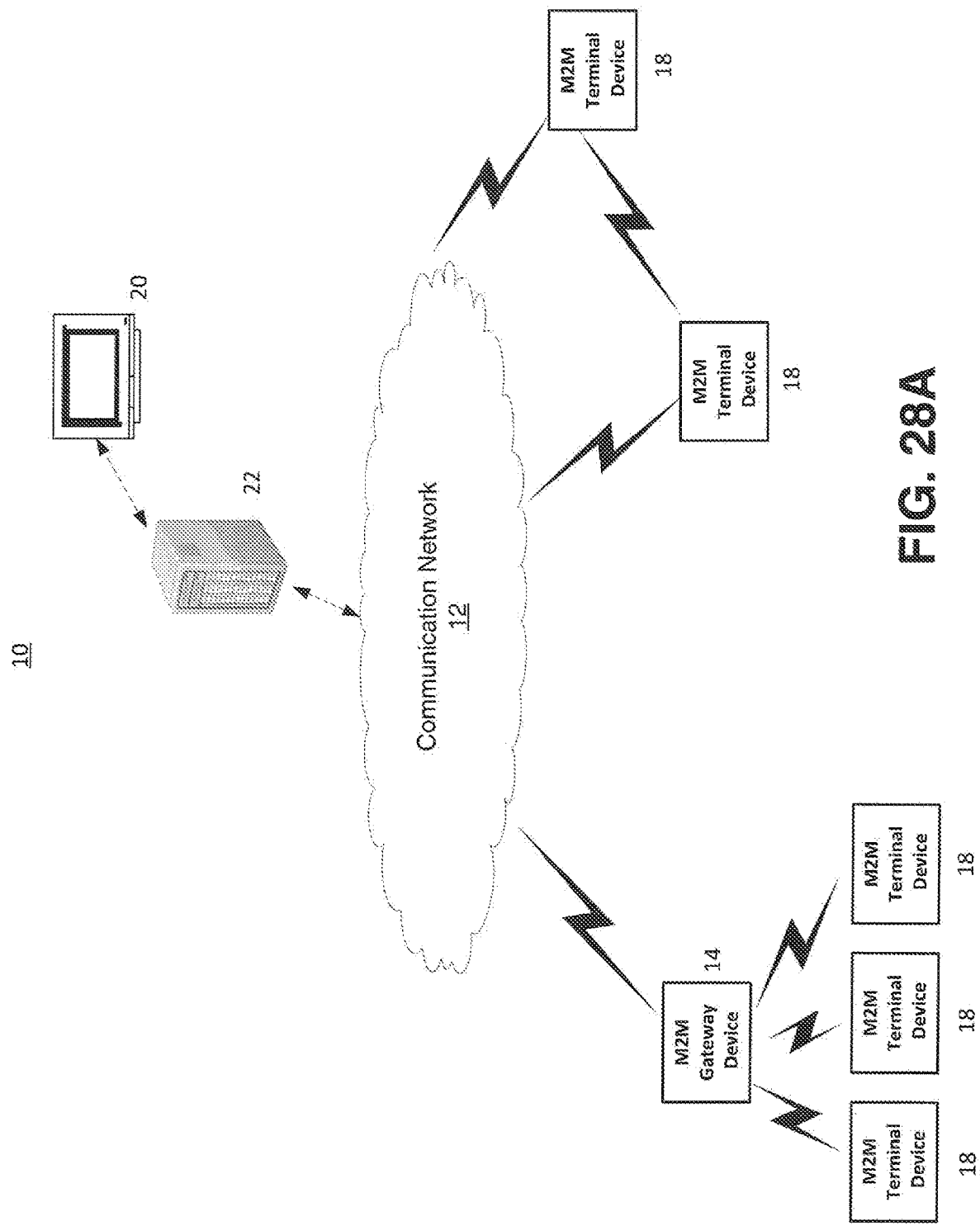
FIG. 28A is a system diagram of an example machine-to-machine (M2M) or Internet of Things (IoT) communication system in which one or more disclosed examples may be implemented.
Figure 28B:
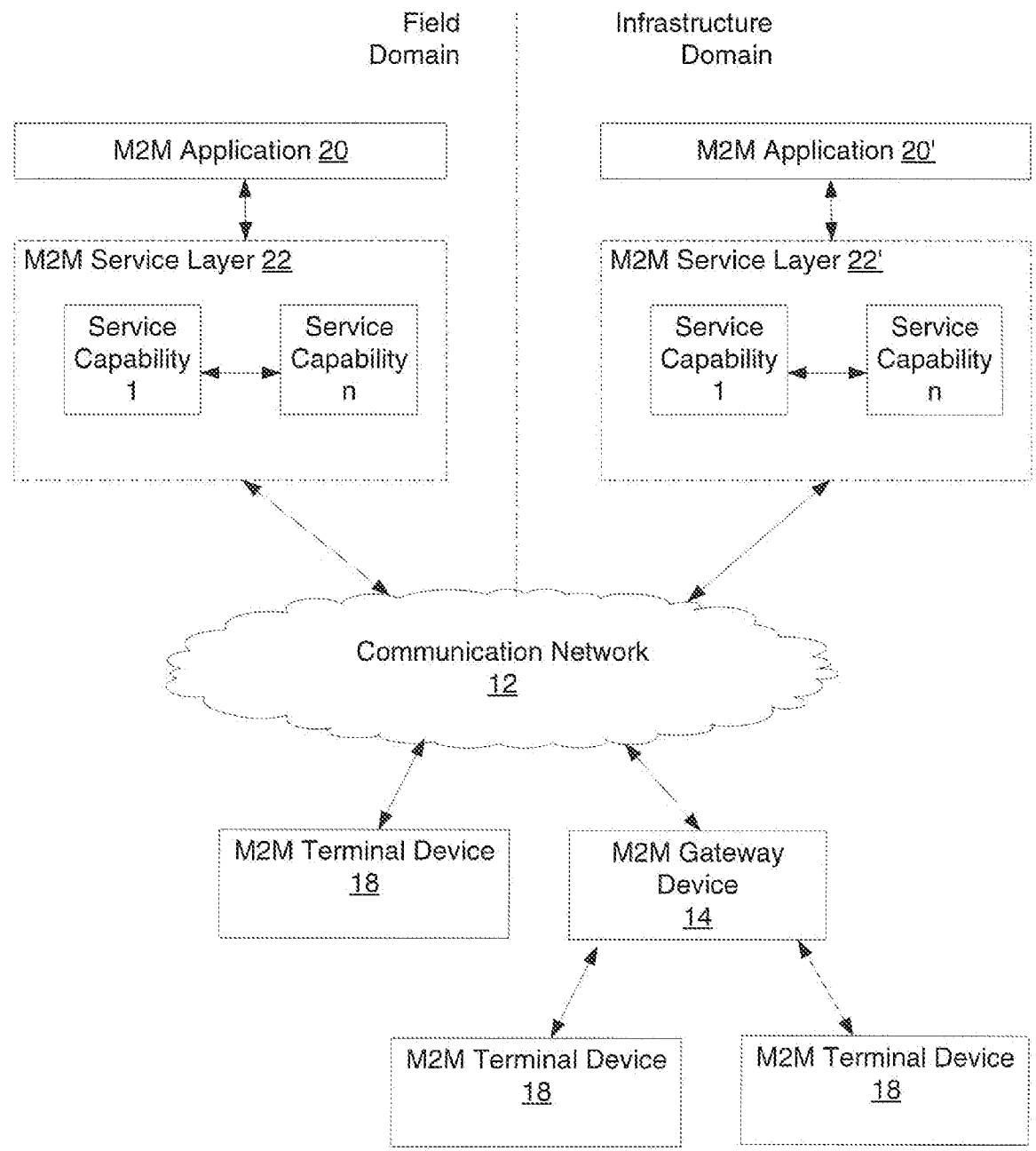
FIG. 28B is a system diagram of an example architecture that may be used within the M2M/IoT communications system illustrated in FIG. 28A.
Figure 28C:
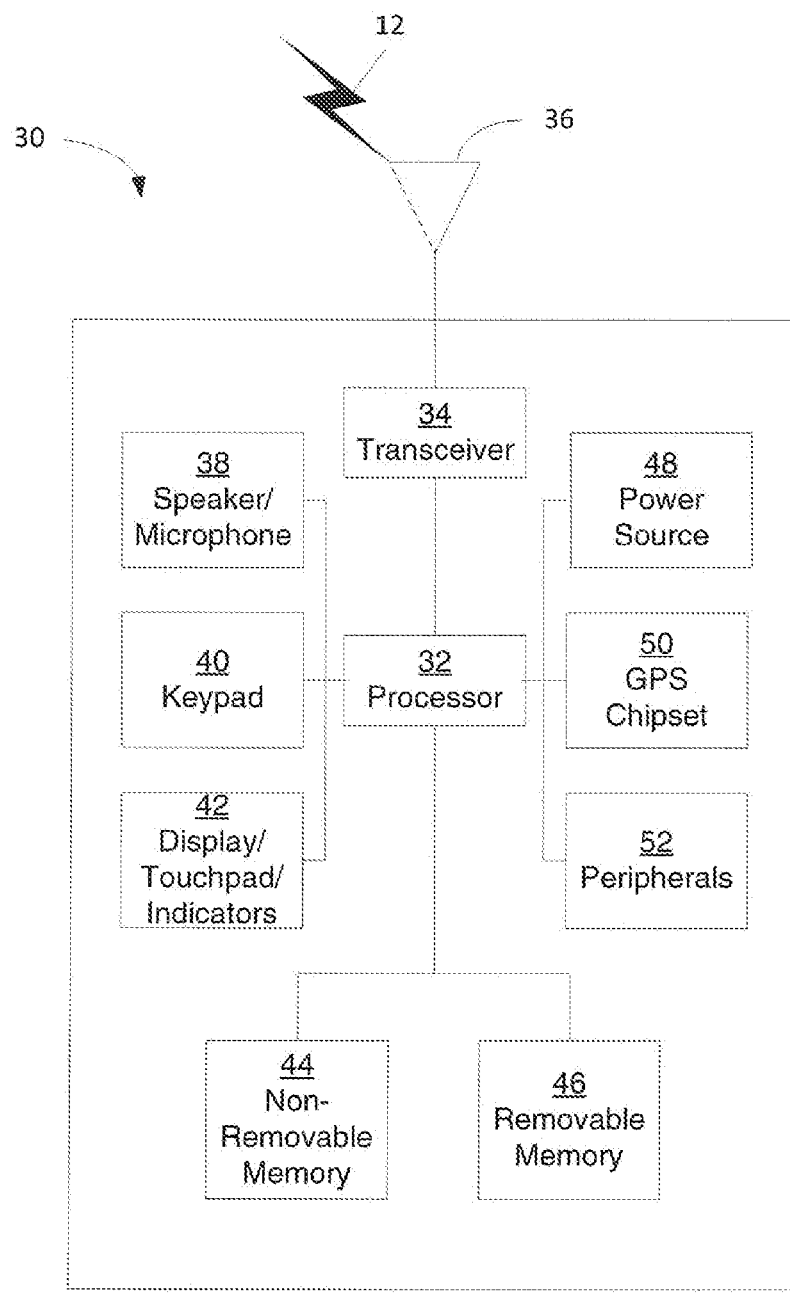
FIG. 28C is a system diagram of an example M2M/IoT terminal or gateway device that may be used within the communications system illustrated in FIG. 28A.
Figure 28D:
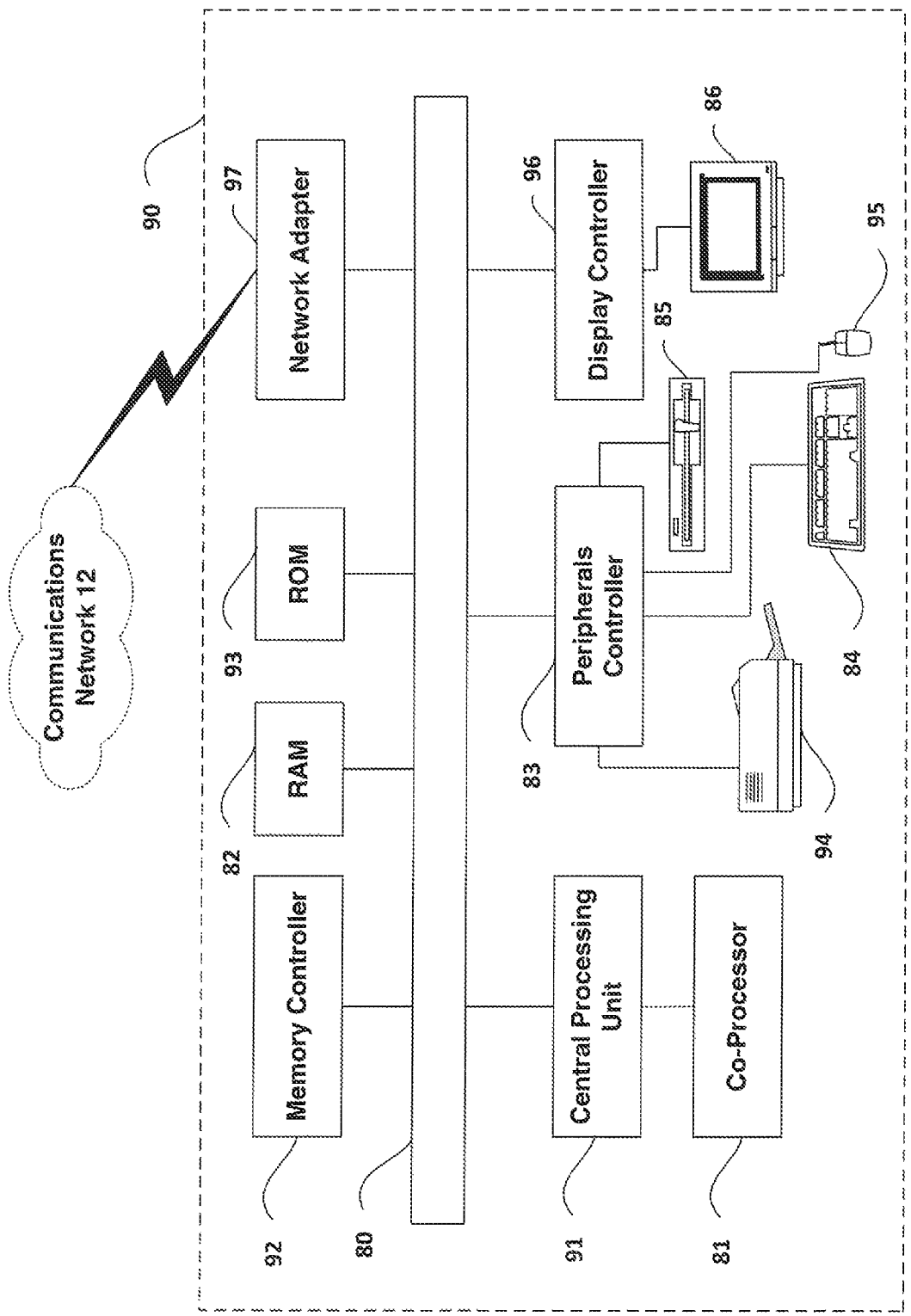
FIG. 28D is a block diagram of an example computing system in which aspects of the communication system of FIG. 28A may be embodied.

It is understood that the entities performing the steps illustrated herein, such as FIG. 12-FIG. 16 are logical entities that may be implemented in the form of software (e.g., computer-executable instructions) stored in a memory of, and executing on a processor of, a device, server, or computer system such as those illustrated in FIG. 28C or FIG. 28D. In an example, with further detail below with regard to the interaction of M2M devices, originator 123 (e.g., AE) of FIG. 12 may reside on M2M terminal device 18 of FIG. 28A, while CSE 109 of FIG. 12 may reside on M2M gateway device 14 of FIG. 28A.

Figure 12:
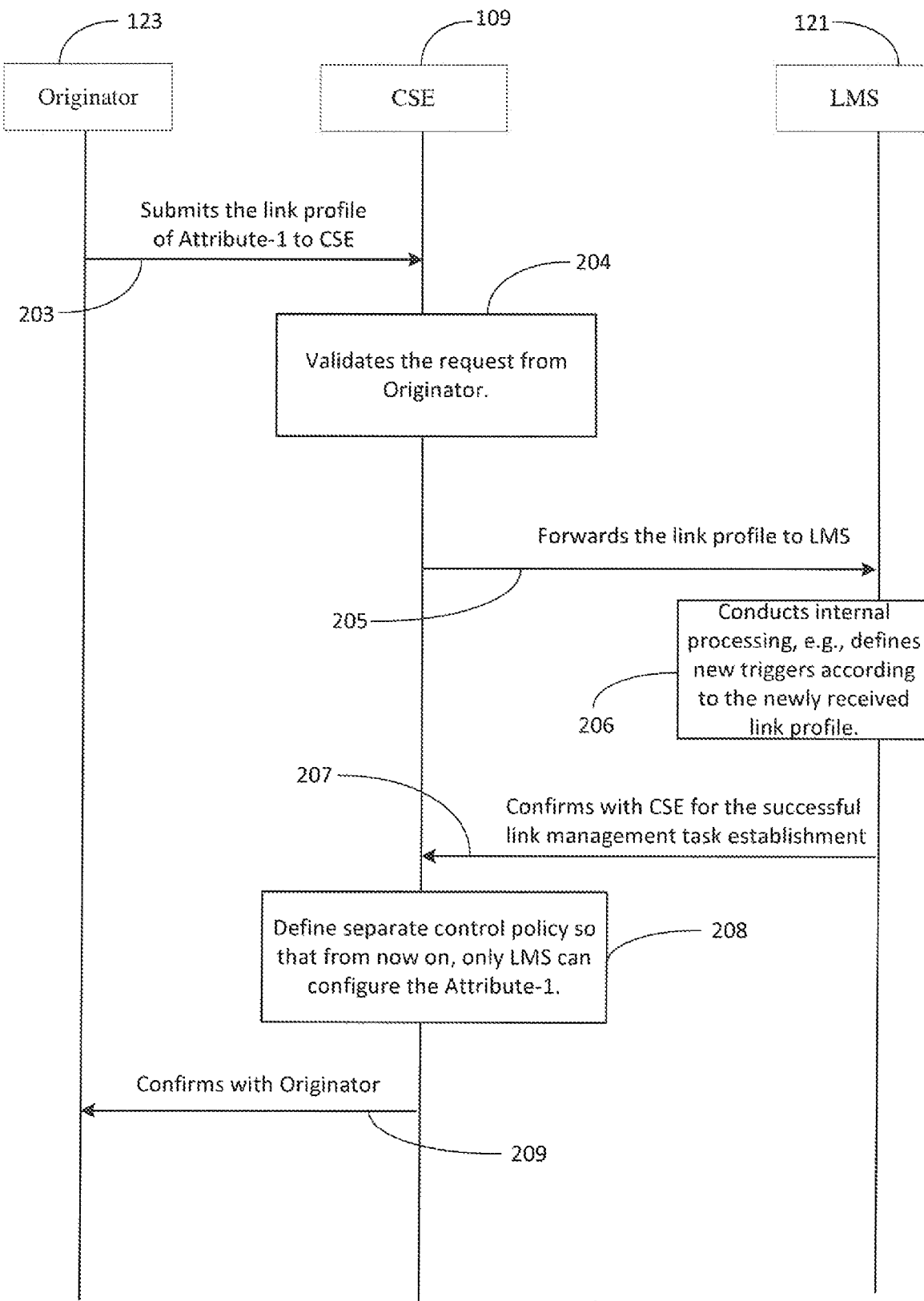
FIG. 12 illustrates an exemplary message flow for creating a link management task.

Discussed below in conjunction with FIG. 12-FIG. 17 are procedures for link management. FIG. 12 illustrates an exemplary flow for creating a link management task for management of a URI of an attribute by an LMS. At step 203, originator 123 sends a request to CSE 109 which may be used to create a link management task for attribute-1 115. The message includes link profile 128 and associated data (e.g., associated data with regard to link profile type). The message of step 203 may be triggered by application logic on originator 123. In another example, LMS 121 may proactively collect link profiles. LMS 121 may actively request link profiles from different entities or use a publish or subscribe mechanism. In yet another instance, LMS 121 may proactively create link profile 128 by observing a systems status. For example, if LMS 121 observes that originator 123 (e.g., an application entity) is off-line from time-to-time, LMS 121 may setup link profile 128 for a "member list" of a <group> resource that originator 123 belongs to such that link profile 128 will lead to the configurations that the URI of originator 123 (e.g., attribute-1 115) will not be in the "member list" when originator 123 is unavailable. A result may be that group operations will not be fanned out to originator 123 during its off-line time, and unnecessary communications are accordingly reduced.

At step 204, CSE 109 validates the request of step 203. For example, CSE 109 may determine whether Resource-A 111 and attribute-1 115 are present, whether originator 123 has the permission for such an operation, etc. If any of those are not true, the request may be rejected by CSE 109 without contacting LMS 121. At step 205, CSE 109 sends link profile 128 to LMS 121. At step 206, LMS validates link profile 128. For example, LMS 121 determines whether attribute-1 115 has already been managed in association with another previously submitted link profile. If so, the request of step 205 may be rejected by LMS if this new submitted profile (link profile 128) does not replace the existing link profile. Otherwise, LMS 121 may: 1) define new triggers according to link profile 128, such that when certain rules/condition are met, LMS 121 could execute corresponding link configuration operations; 2) marks the attribute-1 115 as "managed" (or another term or marking) so that if any other link profiles related to attribute-1 115 are submitted in the future, LMS is able to conduct operations, such as, replacing or updating the old link profile 128, or rejecting the new one, etc.; 3) generates a link management ID (the value could be based on any naming scheme) as the global reference for this link management task (e.g., an entity could send a request to delete an existing link management task by specifying the link management ID). Descriptions below provide further discussion regarding when or where to use a link management ID.

At step 207, LMS 121 sends a confirmation to CSE 109 to indicate that the link management task has been successfully established, along with the link management ID. At step 208, CSE 109 may create a separate access policy specific for attribute-1 115 or CSE 109 may modify existing access control policies such that LMS 121 has access to manipulate the attribute and, if needed, restrict the access for other entities. Those specific access control policies may also be associated with the link Management ID, which can also be used for credential validation such that only the one who can specify the link Management ID in its request will be allowed to do configurations on attribute-1 115. At step 209, CSE 109 may also send back a confirmation along with the link management ID to originator 123 in order for it to be aware of the status of attribute-1 115.

Figure 13:
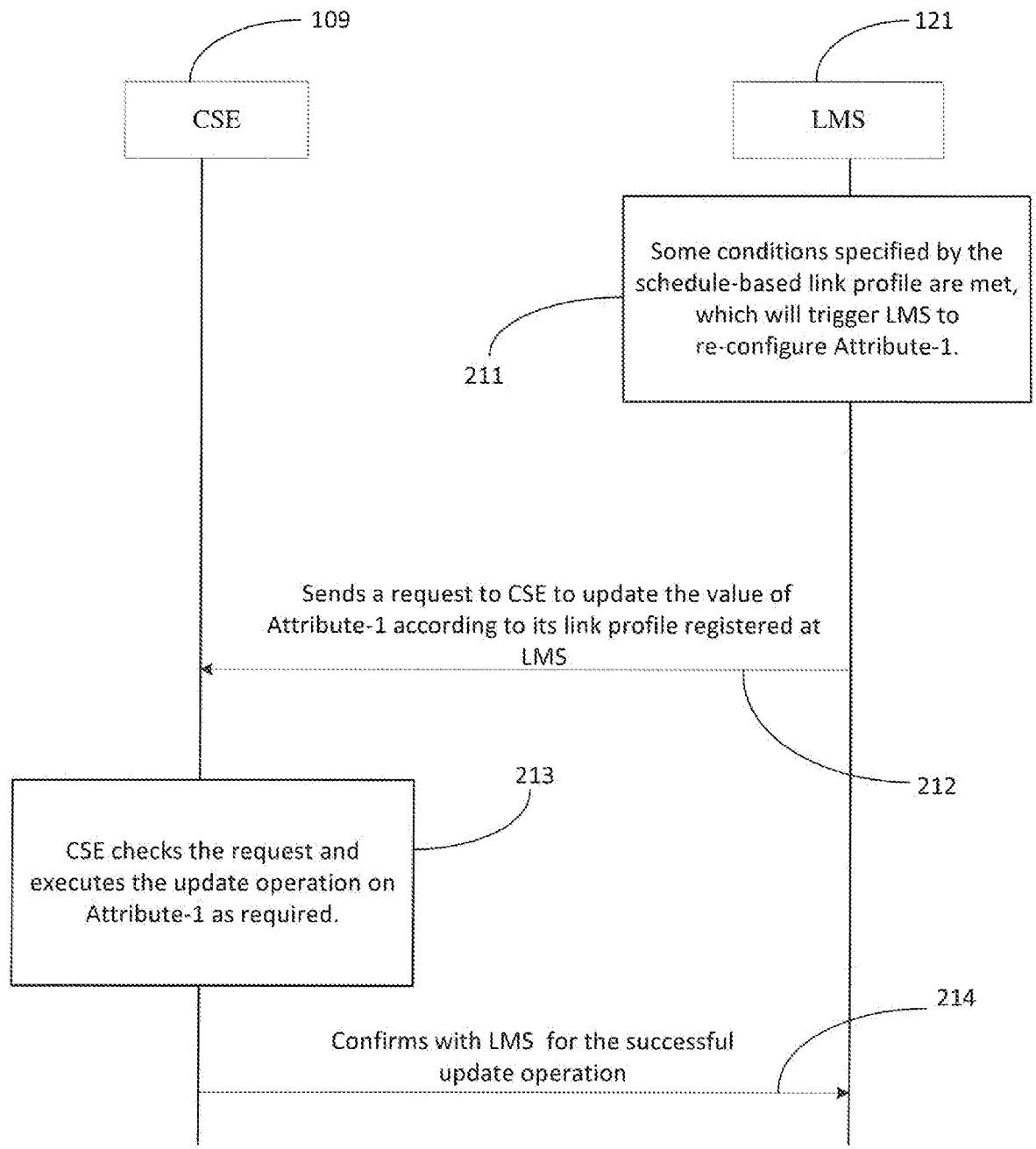
FIG. 13 illustrates an exemplary message flow for conducting link management based on a schedule-based link profile.

FIG. 13 illustrates an exemplary method for conducting link management using a schedule-based link profile. At step 211, LMS 121 is triggered based on a scheduled-based link profile (e.g., link profile 128). For example, LMS 121 may be triggered by a timer to update the value of attribute-1 115. At step 212, LMS 121 sends a request to CSE 109 to update the URI of attribute-1 115 according to link profile 128 of attribute-1 115. The link management ID, which is generated during the link management task establishment may be included in the request so that the CSE 109 can check the operation permission on attribute-1 115. At step 213, CSE 109 determines whether the proposed operation at step 212 is allowed. If so, the value of attribute-1 115 may be updated with the value in the request of step 212. At step 214, CSE 109 sends back a message to LMS 121 with regard to the success or failure of the requested operation.

Figure 14:
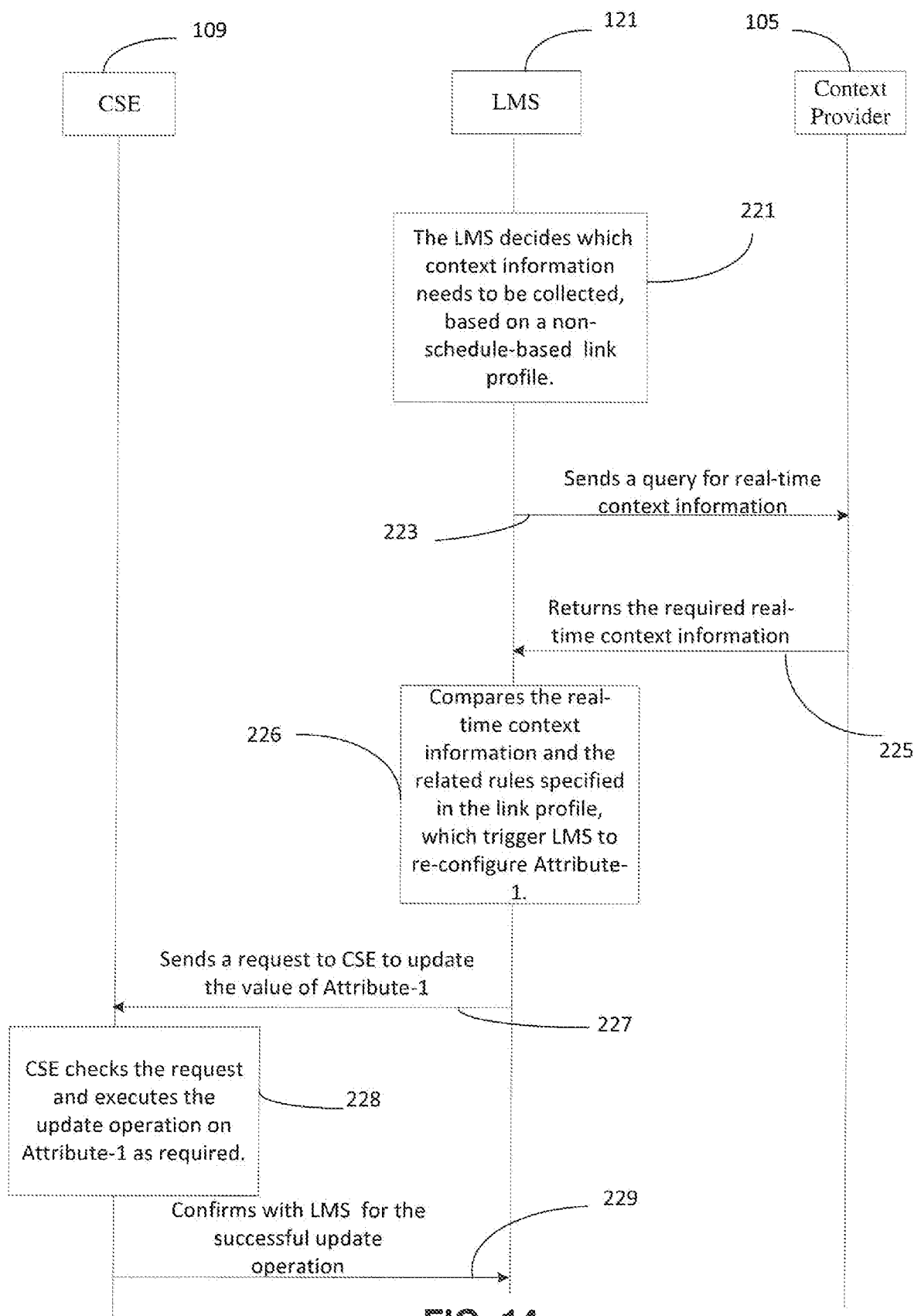
FIG. 14 illustrates an exemplary message flow for conducting link management based on a non-schedule-based link profile.

FIG. 14 illustrates an exemplary method for conducting link management using a non-schedule-based link profile. At step 221, LMS 121 decides which context information needs to be collected based on a non-scheduled-based link profile (e.g., link profile 128). At step 223, LMS 121 sends a query for context information (which may be in real-time). Context information may include bandwidth allocated to a device, latency of a communications session (e.g., associated with delay tolerance of an application), location or running status of a device, classification of power control requirements of a device, or related information that may affect business logic, among other things. LMS 121, alternatively, may establish a subscription relationship with a provider of the requested real-time information. It is assumed herein that some entity exists that collects context information. At step 225, context provider 105 returns the relevant context information based on the request of step 223. At step 226, LMS 121 compares context information and the related rules specified in the non-scheduled link profile, which trigger LMS 121 to re-configure attribute-1 115. At step 227, LMS 121 sends a request to CSE 109 to update the value of attribute-1 115. At step 228, CSE 109 checks the received request of step 227 and executes the update operation on attribute-1 115 as required. At step 229, CSE 109 may send a message to relay the status of the operations associated with step 228.

Figure 15:
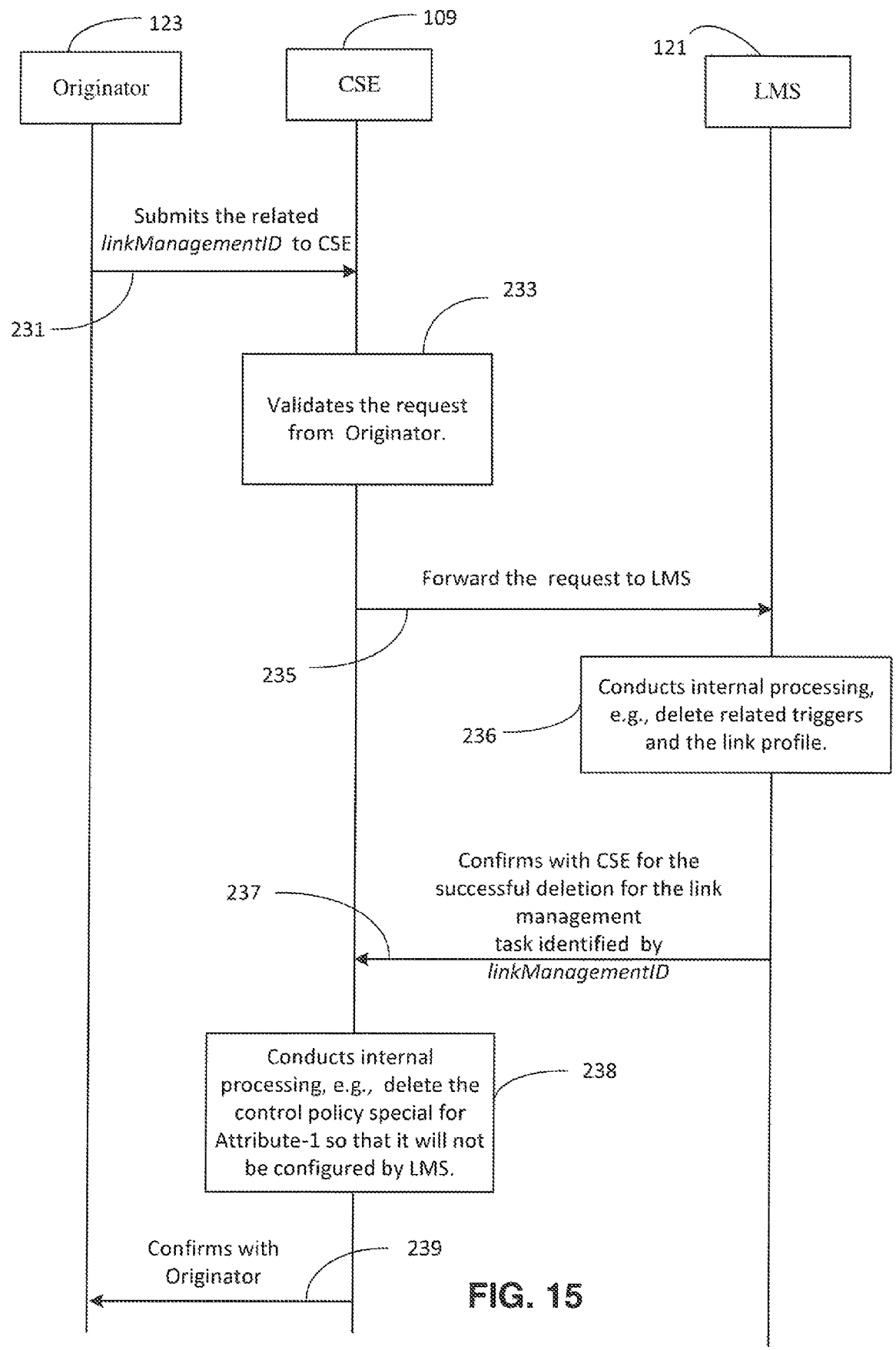
FIG. 15 illustrates an exemplary message flow for deleting a link management task.

FIG. 15 illustrates an exemplary flow for deleting a link management task for management of a URI of an attribute by an LMS. At step 231, originator 123 sends a request to CSE 109 to delete a link management task for attribute-1 115. At step 233, CSE 109 validates the request of step 231. For example, CSE 109 may determine whether originator 123 has the permission for such an operation. At step 235, CSE 109 sends the request to delete the link management task to LMS 121. At step 236, LMS 121 deletes link profile 128 and related triggers. At step 237, LMS 121 sends a confirmation to CSE 109 to indicate that the link management task has been successfully deleted, which may include a link management ID. At step 238, CSE 109 may delete the separate access policy specific for attribute-1 115. Attribute-1 115 can still exist as long as Resource-A 111 is not deleted. At step 239, CSE 109 may send back a confirmation along with the link management ID to originator 123 in order for it to be aware of the status of attribute-1 115.

Figure 16:
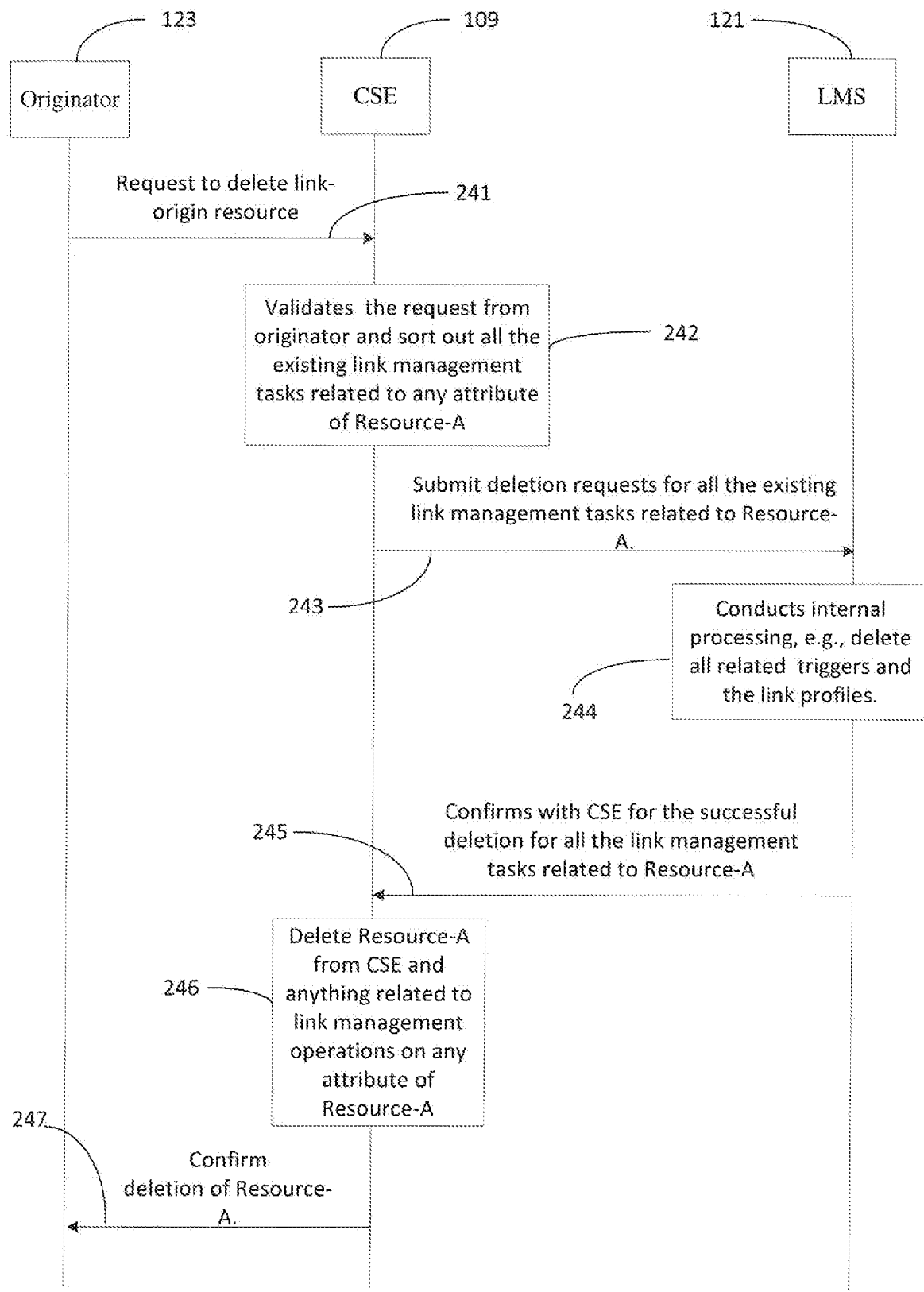
FIG. 16 illustrates an exemplary message flow for deleting a link-origin resource with LMS.

FIG. 16 illustrates an exemplary flow for deleting a link-origin resource. At step 241, originator 123 sends a request to CSE 109 to delete a link-origin resource (e.g., Resource-A 111). At step 242, CSE 109 validates the request of step 241. For example, CSE 109 may determine whether originator 123 has the permission for such an operation. For example, the CSE 109 may also check which attributes of Resource-A 111 to be deleted are currently managed by LMS 121, which can be done by examining all the access control policies (and their associated linkManagementID) that are special for link management operations on those attributes (e.g., attribute-1 115). Those linkManagementID(s) may then be sent to LMS 121.

At step 243, CSE 109 sends the request to delete Resource-A 111 to LMS 121. At step 244, LMS 121 deletes the related triggers and the related link profiles (e.g., link profile 128) corresponding to the received linkManagementID(s). Also, since a resource deletion operation may affect other resources and links as well, some service layer-wide link management operations may also be triggered. At step 245, LMS 121 sends a confirmation to CSE 109 to indicate that the link management tasks related to Resource-A 111 has been successfully deleted. At step 246, CSE 109 deletes Resource-A 111 related to link management operations of attributes of Resource A 111. At step 247, CSE 109 may send back a status message regarding deleting of Resource-A 111.

Note that, for an existing link management task related to a given link profile P, the update procedure is similar to the creating procedure as provided with regard to FIG. 12. In addition, the retrieve operation can be retrieve link profile 128 from LMS 121 by specifying its corresponding link-ManagementID. The procedures related to how to submit, update, and delete SLMP 133 or EHR 131 to/from LMS 121 are similar to those disclosed for the link profile 128.

Figure 17:
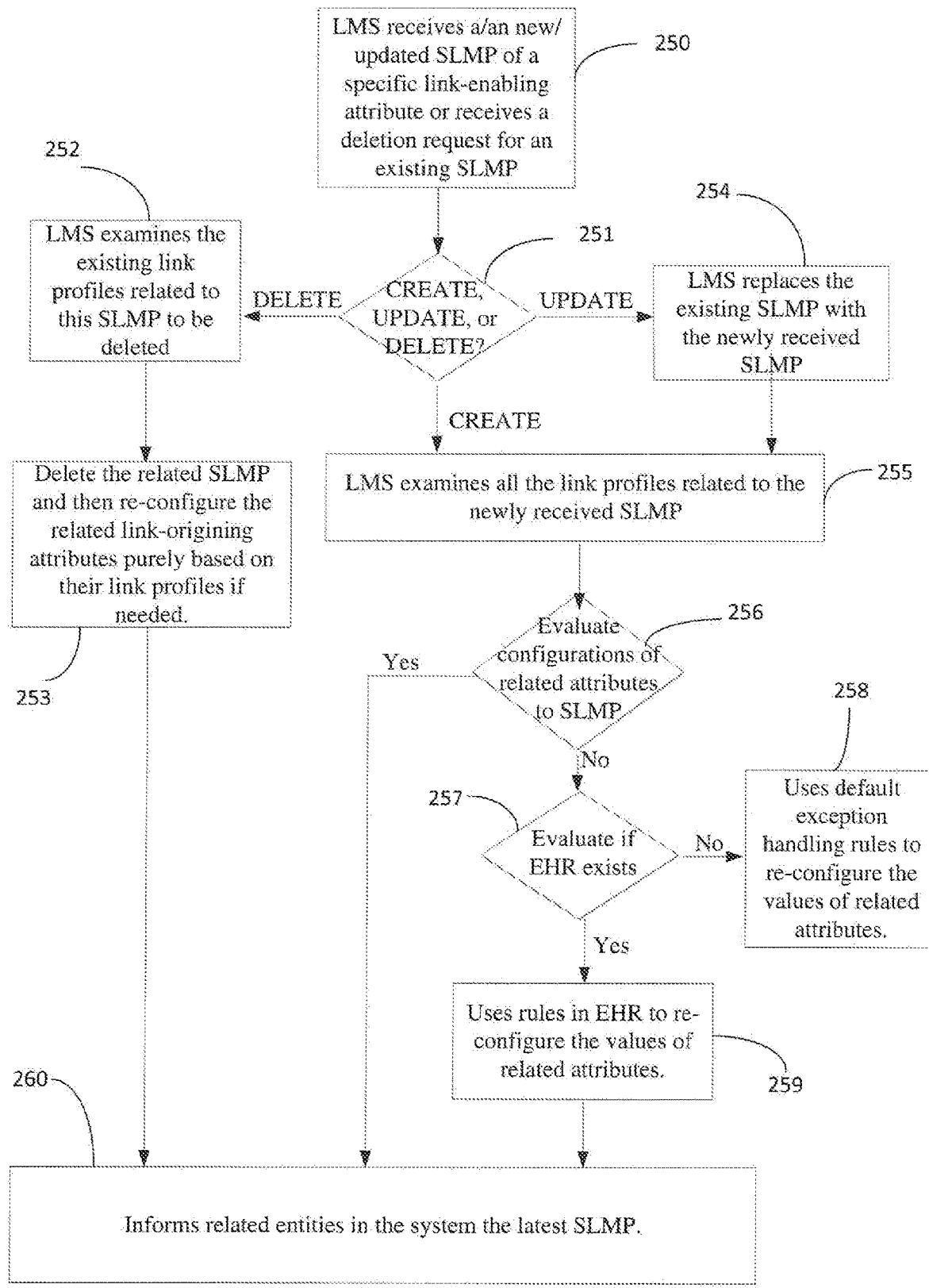
FIG. 17 illustrates an exemplary method for the related actions of LMS when it receives a request for submitting, updating, or deleting an SLMP.

Further discussion is below with regard to the interactions between SLMP, EHR and link profiles used by LMS. FIG. 17 illustrates an exemplary flow chart illustrating related interaction with LMS 121 when it receives a request for submitting, updating, or deleting SLMP, which is also applicable to EHR after some straightforward modifications.

At step 250, LMS 121 receives a new/updated SLMP 133 or receives a deletion request for an existing SLMP 133 stored at LMS 121. At step 251, LMS 121 examines the type of the request (e.g., to see whether a request is a "CREATE" or an "UPDATE"), which could be submitting/creating a new SLMP 133 (if so, go to step 255), updating an existing SLMP 133 (if so, go to step 254), or deleting an SLMP 133 already stored at LMS 121 (if so, go to step 252).

At step 252, LMS 121 examines the registered link profiles (e.g., link profile 128 and link profile 136), which are related to the SLMP 133. To do so, an application scope of SLMP 133 could be utilized, which indicates to which attributes SLMP 133 can be applied. For example, if SLMP 133 to be deleted is applicable to attribute-1 115 and attribute-1 135 of Resource-A 111 and Resource-Z 134, respectively, the link profiles of the attribute-1 of different resources will be examined and sorted out. At step 253, LMS 121 not only deletes SLMP 133, but also re-configures the involved link-enabling attributes (attribute-1 115 and attribute-1 135) based on the link profiles (e.g., link profile 128 and link profile 136) sorted out in step 252. In particular, since there is no SLMP 133 now, the values of those attributes will be re-set based on their link profiles. Then, go to step 251.

At step 254, LMS 121 replaces the existing SLMP 133 with a newly received SLMP. Alternatively, an existing SLMP 133 could be just updated in part as well. At step 255, LMS 121 sorts out all the link profiles that are related to this newly received SLMP and the detailed process is similar to the one described in Step 252.

At step 256, LMS 121 evaluates whether the current link configurations are compliant to this SLMP 133. For example, LMS 121 may evaluate whether the values to be assigned to the associated attributes of those link profiles satisfies the policies specified by this SLMP 133. If Yes, go to Step 260. Otherwise, it shows that values of the related attributes of some resources are not aligned or conflicted with the policies specified by this SLMP 133. Accordingly, the exception handling process is triggered (e.g., go to step 257). At step 257, LMS 121 checks whether EHR 131 exists (typically, a certain SLMP 133 may be associated with a EHR 131). If yes, go to step 258. Otherwise, go to Step 259.

At step 258, LMS 121 may use the default exception handling rules to not only re-configure the values of related attributes, but also temporally disable some triggers used for supporting certain configurations specified by link profiles that are not compliant to this received SLMP 133. At step 259, LMS 121 can directly refer to corresponding EHR 131 and the related operations are similar to step 258.

At step 260, LMS 121 informs other entities in the system of the latest SLMP 133, as needed, so that in the future when new link profiles are defined for the attributes related to SLMP 133, they can follow the latest SLMP 133 to avoid any further conflicts. Previous steps have mainly focused on executing necessary re-configurations for the link-enabling attributes on the existing resources that may be affected by the related operations (CREATE, UPDATE or DELETE) on SLMP 133.

Figure 18:
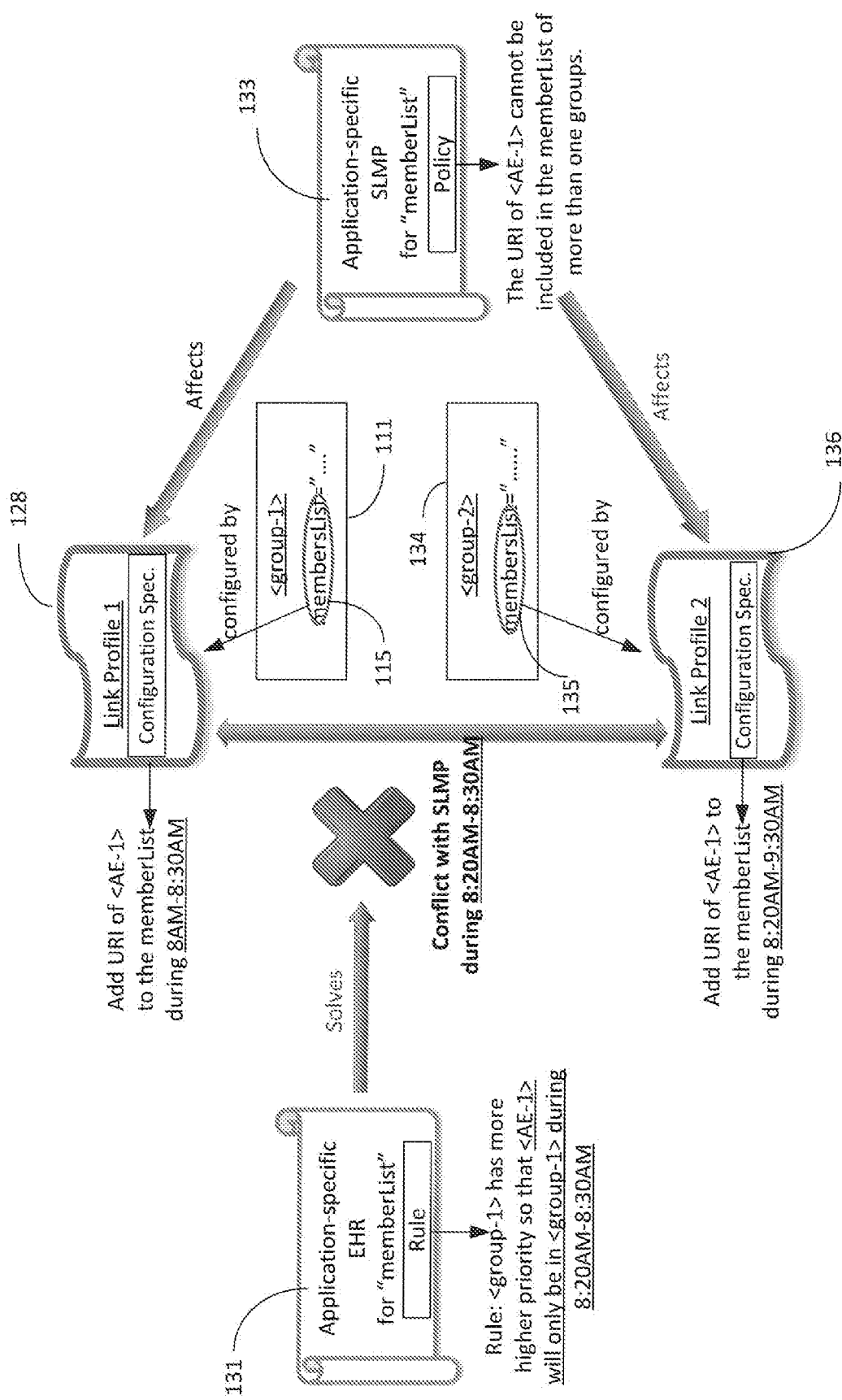
FIG. 18 illustrates exemplary interactions between link profile, SLMP, and EHR.

FIG. 18 is an exemplary illustration of interactions between link profile, SLMP, and EHR. In this example, there are two <group> resources in the system, such as Resource-A 111 and Resource-Z 134. Attribute-1 115 and attribute-1 135 (e.g., memberList attribute of a <group> resource) are configured by LMS 121 based on link profile 128 and link profile 136, respectively. Based on an application-specific requirement (for example), one of the configuration specifications in link profile 128 is that the URI of originator 123 of FIG. 8 (e.g., an AE resource—<AE>) is included in attribute-1 115 during 8 AM-8:30 AM. In addition, the URI pointing to originator 123 is included in attribute-1 135 during 8:20 AM-9:30 AM. Accordingly, the URI pointing to originator 123 will be active in the two resources (the <group> resources) during 8:20 AM-8:30 AM. Also, may be at a later time, LMS 121 may receive SLMP 133 in which a policy is that the URI pointing to originator 123 cannot be included in attribute of more than one group. For this example, such a policy will affect and conflict with the previous-mentioned configuration specifications included in link profile 128 and link profile 136. As a result, EHR 131 will be utilized here to solve the conflict, such that during 8:20 AM-8:30 AM, LMS 121 will only assign URI pointing to originator 123 to attribute-1 115 of Resource-A 134. Here, an assumption is made that attribute-1 115 has a higher priority than attribute-1 135. The priority may be based on factors such as manually assigned priorities or automatically assigned priorities with regard to frequency or time length of URI use. For example with regard to time length, attribute-1 115 may have priority because it is allocated 30 minutes (8:00 AM-8:30 AM), while attribute-1 135 is allocated a total of 50 minutes (8:20 AM-9:30 AM). Attribute-1 135 has a longer time frame to use the URI even after it is restricted to do so based on the result of the priority decision.

Figure 19:
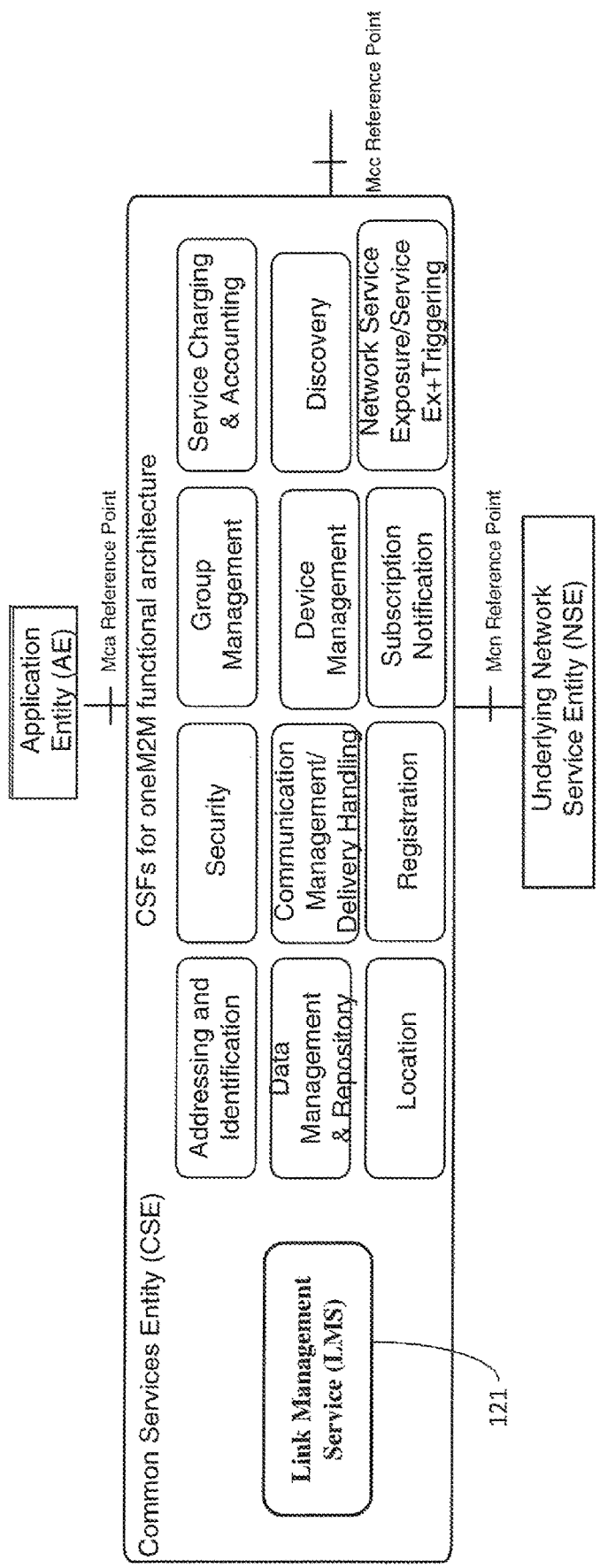
FIG. 19 illustrates an exemplary (LMS) CSF in oneM2M service layer.

Discussed below are examples that discuss link management in relation to how it may be further integrated in oneM2M. oneM2M defines capabilities that are referred to as Capability Service Functions (CSFs). The oneM2M service layer is referred to as a Capability Services Entity (CSE). Accordingly, the disclosed LMS 121 may be regarded as a CSF implemented by a CSE, as shown in FIG. 19.

In a preferable scenario, it is suggested that each CSE implement its own LMS on the same device so that the resource link management operations can be handled by its LMS. However, if a CSE (e.g., CSE 109) is deployed on a resource-constrained node with very limited capability, it can also rely on an LMS (e.g., LMS 121) implemented by another CSE. Note that, even in such a case, it still leads to less communication overhead compared to the case in which a link has to be configured by a remote originator (e.g., originator 123). The disclosed LMS may affect reference point at oneM2M Service Layer in the following ways:

When an AE sends a request (along with a link profile) to a CSE for initiating a link management task on an attribute of a resource hosted by the CSE (e.g., the link-hosting CSE), it can go through mca interface.

When a CSE-1 sends a request (along with a link profile) to another CSE-2 for initiating a link management task on an attribute of a resource hosted by CSE-2 (e.g., the link-hosting CSE), it can go through mcc interface.

When a link-hosting CSE needs to further contact LMS:
When this CSE utilizes LMS implemented by itself, it can involve internal processing on one M2M device or group of related M2M devices.
When a CSE utilizes LMS implemented by another CSE, it may go through mcc interface.

FIG. 20-FIG. 22 illustrate exemplary RESTful resource-based interfaces for the disclosed LMS. The following conventions are used for FIG. 20-FIG. 22:

Rectangular boxes are used for resources and child resources
Rectangular boxes with round corners are used for attribute
Multiplicity of each attribute and child resource is defined
Resource names delimited with "<" and ">" indicate names assigned during the creation of the resource Disclosed herein are resources in terms of <linkProfile> 263, <SLMP> 264 and <EHR> 267 have been defined as shown in FIG. 20-FIG. 22 and each of those resources have a number of attributes. For example, the attributes in <linkProfile> 263 correspond to the different data items as defined in a link file, such as profileType, linkOriginURI, attributeName, destURI, validTimeIntervals, destURICandidateList, contextInfoURI, linkSelectionRules as defined in Table 2-Table 4. Similarly, the attributes in <SLMP> 264 and <EHR> 267 includes information related to associatedEHR for <SLMP> 264 and associatedSLMP for <EHR> 267, affectedAttributeList (which attributes SLMP 264 will affect) and policyList for <SLMP> 264, ruleList for <EHR> 267, respectively.

Figure 23:
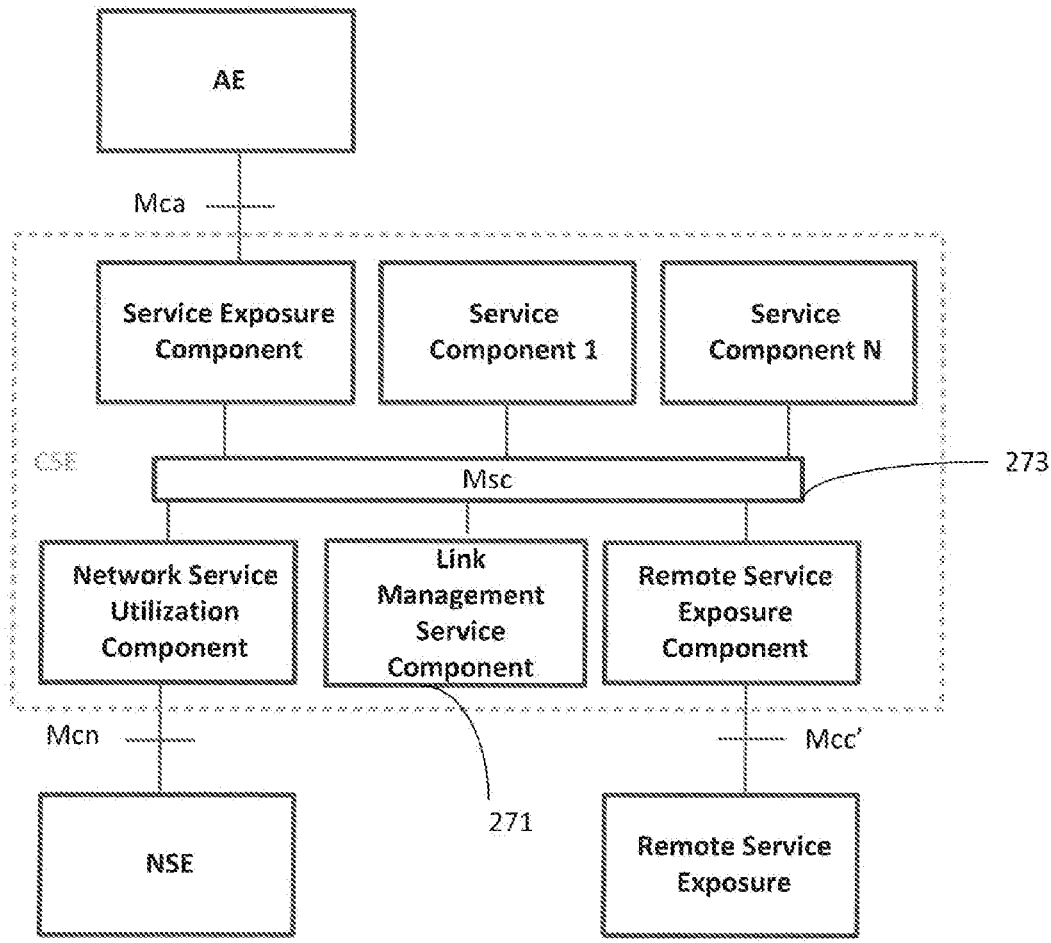
FIG. 23 illustrates an exemplary oneM2M service component architecture.

FIG. 23 is an exemplary illustration of an implementation architecture of LMS 121 in oneM2M service component architecture (e.g., oneM2M-TS-0007 oneM2M Functional Architecture-V-0.3.0). As shown in the FIG. 23, LMS 121 may be implemented by inserting an individual service component called 'Link Management Service Component' 271, which may interact with other components over 'Msc' reference point 273.

Discussed below are link management details with considerations of oneM2M attributes, such as "parentID" attribute, <subscription> resource, and <group> resource.

With the use of LMS 121, Resource-A 111 may dynamically be the child resource of different resources, if needed. To do so, parentID of Resource-A 111 can be configured by two types of link profiles as disclosed herein. The parentID of multiple resources on CSE 109, can also be managed by LMS 121 as well for supporting any application requirement. For example, SLMP 133 can be defined for the "parentID" attribute, based on which resource hierarchy can be dynamically re-organized, or re-structured in a do-as-you-want manner (if it is allowed). Note that, any application specific policies can be defined as SLMP 133 to enable new features allowed by any existing, or future oneM2M specifications (or any other standards). For example, the following example policies can also be included in SLMP 133 for the "parentID" attribute:

1. A policy that two set of resources cannot share the same parent due to e.g., security issue (such that how to configure the parentID of resources in one set will affect those configurations on the resources on the other set).
2. A policy that a parentID attribute can be assigned with multiple URIs at the same time so that a resource can have more than one parent. In particular, FIG. 24 shows a value-added service when such a policy is applied to the "parentID" attribute of a <subscription> resource.

Figure 24:
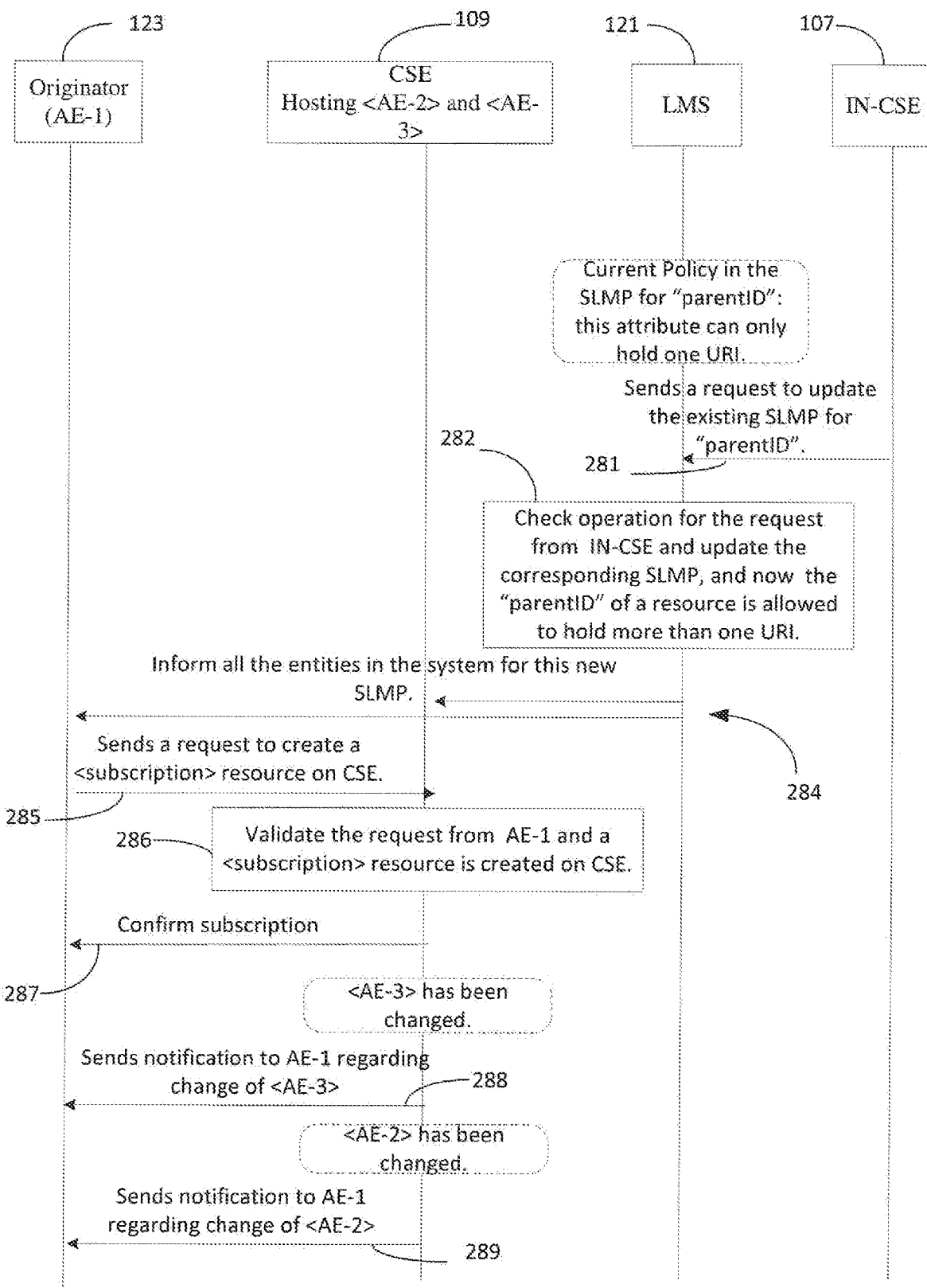
FIG. 24 illustrates an exemplary message flow for value-added service enabled by LMS-SLMP.
Figure 25:
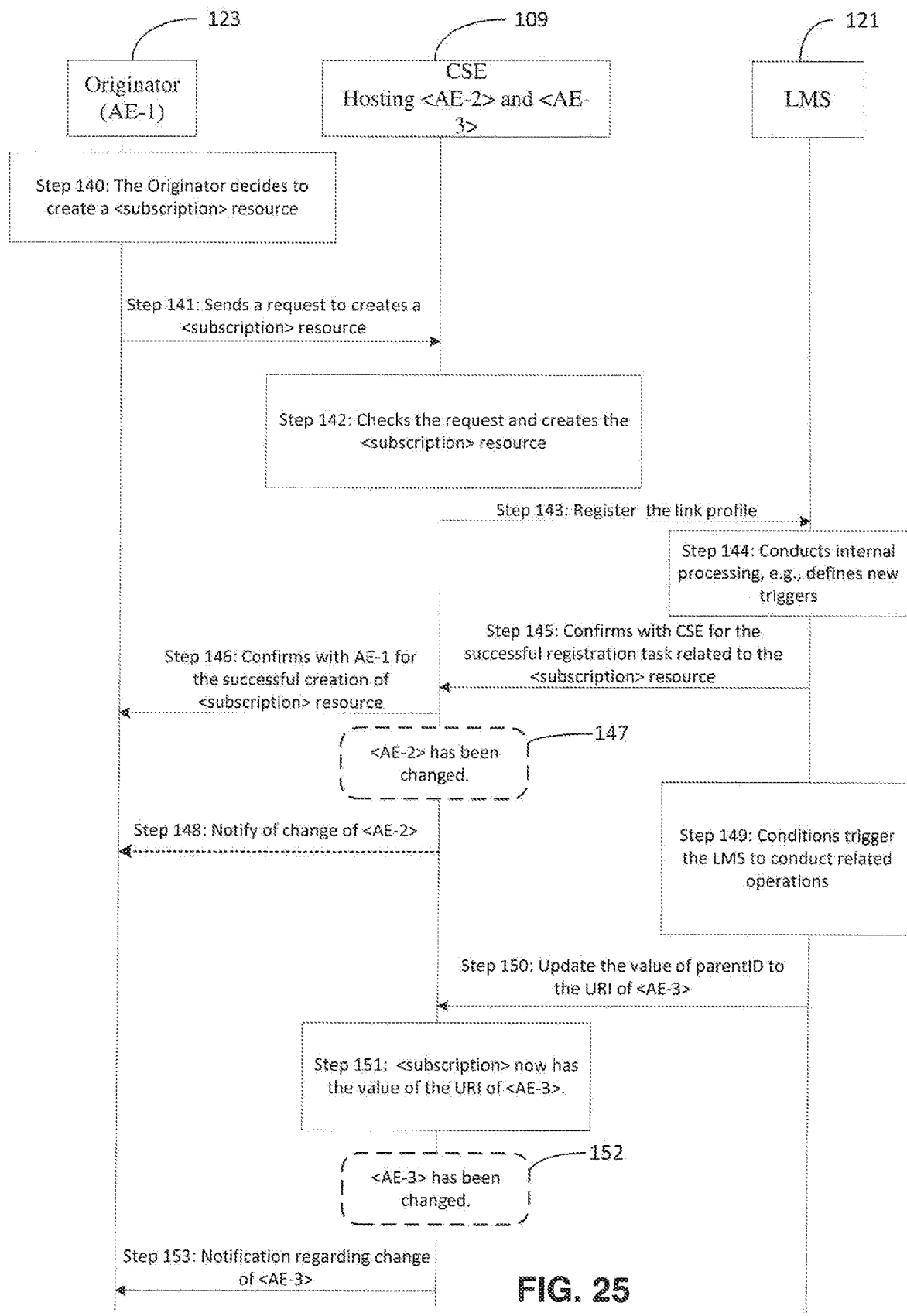
FIG. 25 illustrates an exemplary message flow for value-added service enabled by LMS-link profile.
Figure 26:
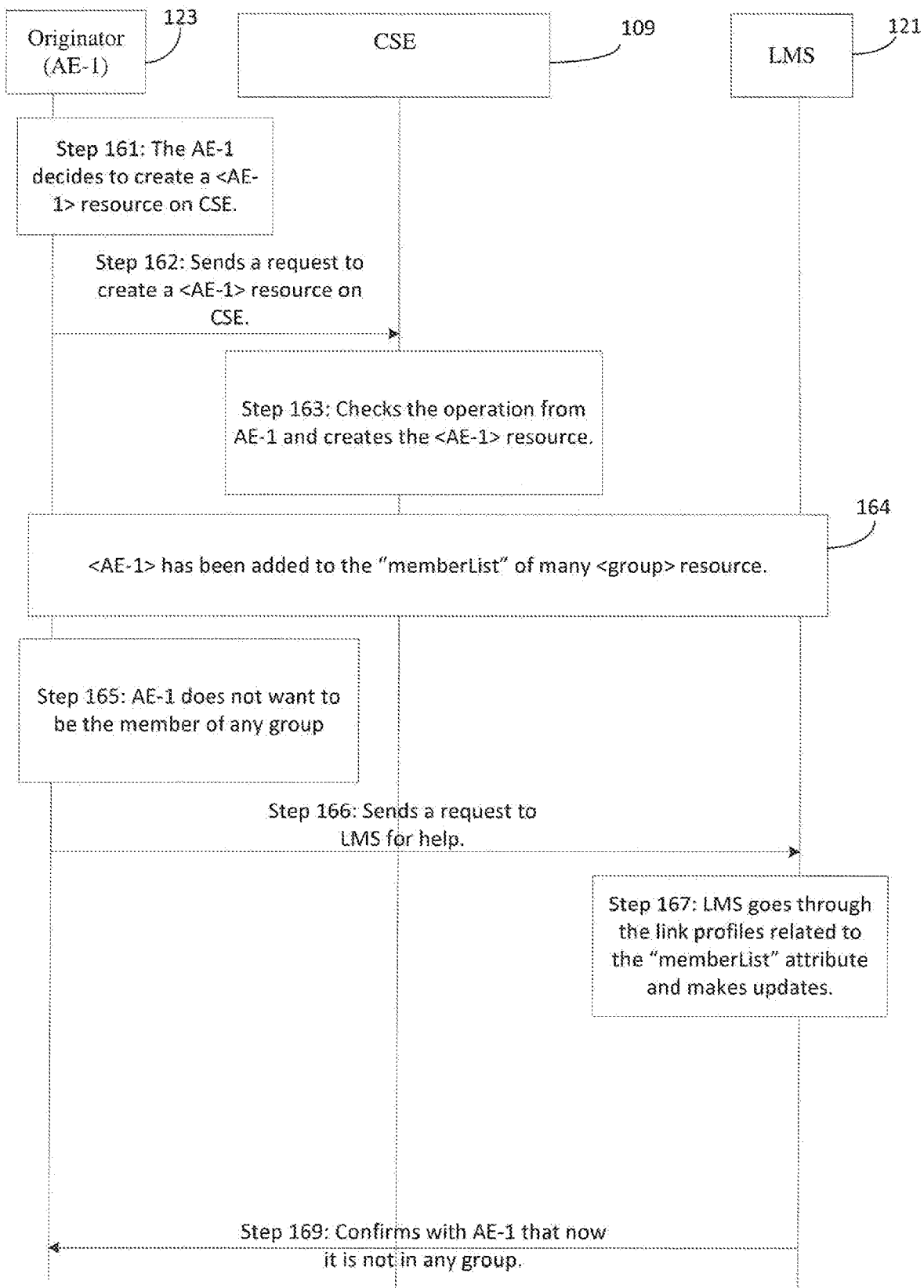
FIG. 26 illustrates an exemplary operation of LMS on the "memberList" of <group> resource.

It is understood that the entities performing the steps illustrated herein, such as FIG. 24-FIG. 26, are logical entities. The steps that may be stored in a memory of, and executing on a processor of, a device, server, or computer system such as those illustrated in FIG. 28C or FIG. 28D. In an example, with further detail below with regard to the interaction of M2M devices, originator 123 of FIG. 26 may reside on M2M terminal device 18 of FIG. 28A, while CSE 109 of FIG. 26 may reside on M2M gateway device 14 of FIG. 28A.

FIG. 24 is an exemplary illustration of a method on a parentID attribute using LMS. As shown in FIG. 24, in the beginning, one resource can have one parent as defined by an existing oneM2M specification. At step 281, IN-CSE 107 may submit a new SLMP 133 to LMS 121. This request may be triggered by an application, for allowing one resource to have more than one parent. At step 282, LMS 121 updates the corresponding SLMP so the "parentID" of a resource is allowed to hold more than one URI. At step 284, LMS 121 informs the entities (e.g., originator 123 and CSE 109) in the system for this SLMP 133. At step 285, originator 123 (e.g., AE-1) may send a request to CSE 109 to create a <subscription> resource because it (originator 123) is interested in resources <AE-2> of CSE 109 and <AE-3> of CSE 109. However, instead of creating two separate <subscription> resources for <AE-2> and <AE-3>, with the new policy, AE-1 just needs to create one <subscription> and set its parentID with the URIs of both <AE-2> and <AE-3>. At step 286, CSE 109 validates the request of step 285. At step 287, CSE 109 may send a notification to originator 123 with regard to the status of the subscription requested at step 286. At step 288 and step 289, CSE 109 may send a notification with regard to any changes to <AE-2> and <AE-3>, respectively. Accordingly, originator 123 can receive notifications not only regarding a change on <AE-2> resource but also that on <AE-3> resource.

FIG. 25 is an exemplary illustration of a method for value-added service enabled by link profile for parent ID of <subscription> resource. In this example, on resource can dynamically be a child resource of different resources. In FIG. 25, it is assumed that one resource can have only one parent. However, originator 123 (e.g., <AE-1>) may send a request to CSE 109 to create a <subscription> resource along with link profile 128 for its parentID attribute. As in the previous case (FIG. 24), originator 123 is interested in both resource <AE-2> and <AE-3>, but in an alternative way. At CSE 109, based on the request received from originator 123, it creates a <subscription> resource and sets its parentID to be the URI of <AE-2> based on the specification defined in the corresponding link profile P. Accordingly, originator 123 can receive notifications regarding the change on <AE-2>. At another time, when some conditions are met, the LMS will be triggered to automatically update the parentID of the <subscription> resource to be the URI of <AE-3>, originator 123 will receive notifications regarding changing to <AE-3>.

Since LMS can be an entity for system-wide link management, it also has the benefit in terms of operation efficiency. For example, LMS may also answer questions (like how many groups a resource belongs to), which are not immediately clear or cannot be directly answered by accessing an attribute of a resource. The disclosed attributes and link building operations on those attributes are not strictly symmetric. For example, a memberListID has been defined for a <group> resource but a resource does not have the groupList attribute which can hold the groups it belongs to. It is true that such a new attribute can be defined by enhancing the existing oneM2M specification. Alternatively, another way is to ask LMS for help if the links are managed by LMS, from which the answer can also be easily obtained, for example by examining link profiles.

With continued reference to FIG. 25, at step 140, originator 123 decides to create a <subscription> resource on CSE 109 because it is interested in <AE-2> and <AE-3> resources. At step 141, originator 123 (<AE1>) sends a request to create a <subscription> resource on CSE 109, along with a link profile for its "parentID" attribute. At step 142, CSE 109 checks the operation correctness for the request from originator 123 and creates the <subscription> resource, in which the parentID is defaulted to having the value of the URI of <AE-2>. At step 143, CSE 109 sends a message for registering the link profile to LMS 121. At step 144, LMS 121 conducts internal processing (e.g., defines new triggers according to the received link profile). At step 145, LMS 121 sends a message to confirm with CSE 109 with regard to the successful registration for the link management task related to the <subscription> resource. At step 146, CSE 109 confirms with originator 123 for the successful creation of the <subscription> resource. At 147, <AE-2> of CSE 109 has changed. At step 148, CSE 109 notifies originator 123 with regard to the change of <AE-2>. At step 149, a condition is checked by LMS 121, which triggers action on updating the value of "parentID" attribute of <subscription> resource as specified in the link profile. At step 150, LMS 121 sends a request to CSE 109 to update the value of parentID to the URI of <AE-3>. At step 151, CSE 109 checks the request of step 150 and executes the update operation such that the parentID of the <subscription> has the value of the URI of <AE-3>. At step 152 <AE-3> has been changed. At step 153, CSE 109 notifies AE-1 regarding the change of <AE-3> since the current value of parentID is set to the URI of <AE-3> due to the previous link management operation.

FIG. 26 shows that initially an <AE-1> resource has been created on CSE 109 and it has been added to a number of groups. At a later time, due to an application requirement, for example, originator 123 does not want to be the member of any group, however, it does not know which groups it currently belongs to. Accordingly, it may send a request to LMS for this matter. Assuming all the links in the system are configured by LMS, LMS could just quickly go through all the link profiles related to the "memberList" attribute of all the <group> resources and then eliminate the URI of <AE-1> from those groups. For example, any link configuration related to including such a URI in the value of the "memberList" attribute will be deleted from related link profiles. By doing so, <AE-1> will no longer belong to any group. This may be a value-added service enabled by the disclosed LMS. In particular, an AE can send a query request to LMS, so that LMS can answer which groups this AE currently belongs to.

With continued reference to FIG. 26, at step 161, originator 123 decides to create a <AE-1> resource on CSE 109. At step 162, originator 123 (AE-1) sends a request to create a <AE-1> resource on CSE 109. At step 163, CSE 109 checks the operation of the request from originator 123 and creates the <AE-1> resource. At step 164, <AE-1> has been added to the "memberList" of many <group> resource by other entities based on needed business logic (without informing AE-1). At step 165, originator 123 determines that it does not want to be a member of any group (e.g., based on an application requirement), but it (originator 123) does not know which group it currently belongs to. At step 166, originator 123 sends a request to LMS 121 for assistance in removing <AE-1> associated with originator 123 from the groups. At step 167, LMS 121 goes through the link profiles related to the "memberList" attribute in which the URI of <AE-1> is included and deletes the URI of <AE-1> from all of those related "memberList" attributes. At step 168, LMS 121 may send a message to originator 123 which indicates to originator 123 (AE-1) that it is not in any group. Note herein that the terms "originator" and "AE" may be used interchangeably. The originator may be a device with an application loaded (e.g., AE-1) or it may be the AE-1.

Figure 27:
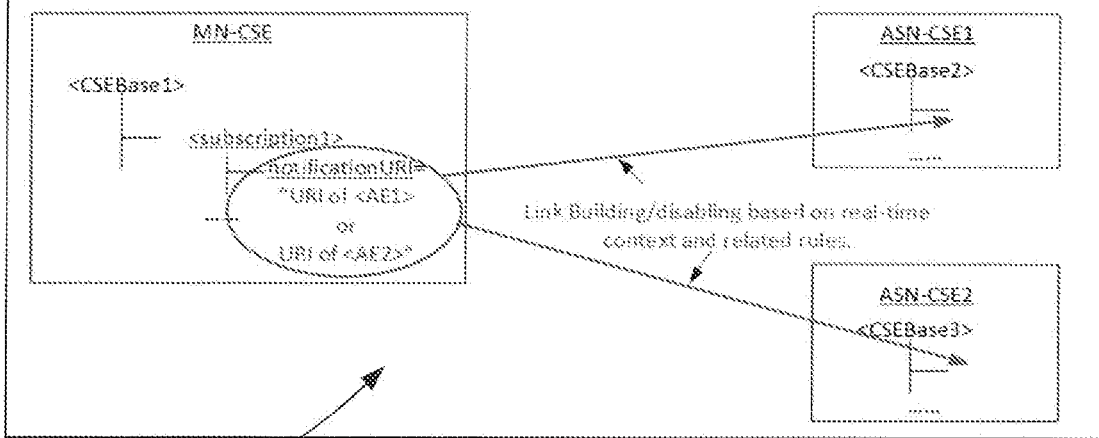
FIG. 27 illustrates an exemplary user interface for utilizing resource link management.

FIG. 27 illustrates an exemplary display (e.g., graphical user interface) that may be generated based on the methods and systems discussed herein. Display interface 901 (e.g., touch screen display) may provide text in block 902 associated with resource link management (e.g., LMS), which may be used to display or query parameters, such as shown in Table 1 through Table 4. In another example, progress of any of the steps (e.g., sent messages or success of steps) discussed herein may be displayed, such as shown in FIG. 12-FIG. 16 or FIG. 24-FIG. 26. In addition, graphical output 903 may be displayed on display interface 901. Graphical output 903 may be the topology of the devices with regard to resource link management (e.g., LMS), a graphical output of the progress of any method or systems discussed herein, or the like.

With continued reference to FIG. 27, the graphical user interface (GUI) of block 902 allows the checking of real-time status of tasks running at LMS. Typically, since many of the tasks running at LMS are based on the specifications defined in various link profiles, SLMPs, or EHRs, the GUI of block 902 will allow monitoring of how those files are being used in the link management tasks. Taking link profile as an example, there may be a selection of a link profile to check (e.g., it could be the one has been used most frequently in all link management tasks, or the one that has been used least frequently in the link management tasks). Alternatively, if there is a desire to check a specific link profile, a specific link profile ID may be entered. Such GUI usages for link profiles are also applicable to other types of entities storing at LMS, e.g., SLMP and EHR.

Without in any way limiting the scope, interpretation, or application of the claims appearing herein, a technical effect of one or more of the examples disclosed herein is to provide adjustments to how links are managed. The link configurations (and related intelligence) may be handled or stored by a special entity. Another technical effect of one or more of the concepts disclosed herein is that, by comparison to conventional implementations, if a CSE supports the link management on the parent ID attribute, the resources on this CSE can then be moved across the resource tree (e.g., assigning different URI values to the parentID attribute) such that the resource hierarchy can be organized in a more flexible way. Just as an example, the "parentID" of a <container> resource could be dynamically assigned with one or more URIs of different AEs so that those AEs can easily share and exchange data if needed. Another technical effect of the LMS disclosed herein is a resource (e.g., a <subscription> resource) can dynamically and selectively send a notifications to more than one receiver based on a defined requirement and therefore enable new value-added services.

While the oneM2M architecture is described by way of background herein and may be used to illustrate various concepts described hereinafter, it is understood that implementations of the concepts described hereinafter may vary while remaining within the scope of the present disclosure. One skilled in the art will also recognize that the disclosed concepts are not limited to implementations using the oneM2M architecture discussed above, but rather may be implemented in other architectures and systems, such as ETSI M2M and other M2M systems and architectures.

FIG. 28A is a diagram of an example machine-to machine (M2M), Internet of Things (IoT), or Web of Things (WoT) communication system 10 in which one or more disclosed concepts may be implemented, such as FIG. 8. Generally, M2M technologies provide building blocks for the IoT/WoT, and any M2M device, M2M gateway or M2M service platform may be a component of the IoT/WoT as well as an IoT/WoT service layer, etc.

As shown in FIG. 28A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may comprise of multiple access networks that provides content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 28A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain includes M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals via the communication network 12 or direct radio link. The M2M gateway device 14 allows wireless M2M devices (e.g. cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service layer 22, as described below. M2M devices 18 and gateways 14 may communicate via various networks including, cellular, WLAN, WPAN (e.g., Zigbee, 6LoWPAN, Bluetooth), direct radio link, and wireline for example.

Referring to FIG. 28B, the illustrated M2M service layer 22 (e.g., service layer 104) in the field domain provides services for the M2M application 20, M2M gateway devices 14, and M2M terminal devices 18 and the communication network 12. It will be understood that the M2M service layer 22 may communicate with any number of M2M applications, M2M gateway devices 14, M2M terminal devices 18, and communication networks 12 as desired. The M2M service layer 22 may be implemented by one or more servers, computers, or the like. The M2M service layer 22 provides service capabilities that apply to M2M terminal devices 18, M2M gateway devices 14 and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateway devices 14 and M2M terminal devices 18 in the field domain. It will be understood that the M2M service layer 22' may communicate with any number of M2M applications, M2M gateway devices and M2M terminal devices. The M2M service layer 22' may interact with a service layer by a different service provider. The M2M service layer 22' may be implemented by one or more servers, computers, virtual machines (e.g., cloud/compute/storage farms, etc.) or the like.

Referring also to FIG. 28B, the M2M service layer 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layer 22 and 22' also enables M2M applications 20 and 20' to communicate through various networks 12 and 12' in connection with the services that the service layer 22 and 22' provide.

In some examples, M2M applications 20 and 20' may include desired applications that communicate using messages associated with resource link management (e.g., LMS), as discussed herein. The M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20 and 20'.

The resource link management (e.g., LMS) of the present application may be implemented as part of a service layer. The service layer (e.g. service layer 104) is a software middleware layer that supports value-added service capabilities through a set of application programming interfaces (APIs) and underlying networking interfaces. An M2M entity (e.g., an M2M functional entity such as a device, gateway, or service/platform that may be implemented by a combination of hardware and software) may provide an application or service. Both ETSI M2M and oneM2M use a service layer that may contain the resource link management (e.g., LMS) of the present application. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE), which can be hosted on different types of network nodes (e.g. infrastructure node, middle node, application-specific node). Further, the resource link management (e.g., LMS) of the present application can be implemented as part of an M2M network that uses a Service Oriented Architecture (SOA) and/or a resource-oriented architecture (ROA) to access services such as the resource link management (e.g., LMS) of the present application.

FIG. 28C is a system diagram of an example M2M device 30, such as an M2M terminal device 18 or an M2M gateway device 14 for example. As shown in FIG. 28C, the M2M device 30 may include a processor 32, a transceiver 34, a transmit/receive element 36, a speaker/microphone 38, a keypad 40, a display/touchpad 42, non-removable memory 44, removable memory 46, a power source 48, a global positioning system (GPS) chipset 50, and other peripherals 52. It will be appreciated that the M2M device 30 may include any sub-combination of the foregoing elements while remaining consistent with the disclosed subject matter. M2M device 30 (e.g., M2M gateway 122, M2M device 125, M2M device 126, M2M device 127, M2M server 124, and others) may be part of an exemplary implementation that performs the disclosed systems and methods for resource link management (e.g., LMS).

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, and/or any other functionality that enables the M2M device 30 to operate in a wireless environment. The processor 32 may be coupled to the transceiver 34, which may be coupled to the transmit/receive element 36. While FIG. 28C depicts the processor 32 and the transceiver 34 as separate components; it will be appreciated that the processor 32 and the transceiver 34 may be integrated together in an electronic package or chip. The processor 32 may perform application-layer programs (e.g., browsers) and/or radio access-layer (RAN) programs and/or communications. The processor 32 may perform security operations such as authentication, security key agreement, and/or cryptographic operations, such as at the access-layer and/or application layer for example.

The transmit/receive element 36 may be configured to transmit signals to, or receive signals from, an M2M service platform 22. For example, the transmit/receive element 36 may be an antenna configured to transmit and/or receive RF signals. The transmit/receive element 36 may support various networks and air interfaces, such as WLAN, WPAN, cellular, and the like. In an example, the transmit/receive element 36 may be an emitter/detector configured to transmit and/or receive IR, UV, or visible light signals, for example. In yet another example, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 28C as a single element, the M2M device 30 may include any number of transmit/receive elements 36. More specifically, the M2M device 30 may employ MIMO technology. Thus, for example, the M2M device 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M device 30 may have multi-mode capabilities. Thus, the transceiver 34 may include multiple transceivers for enabling the M2M device 30 to communicate via multiple RATs, such as UTRA and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other examples, the processor 32 may access information from, and store data in, memory that is not physically located on the M2M device 30, such as on a server or a home computer. The processor 32 may be configured to control lighting patterns, images, or colors on the display or indicators 42 in response to whether the LMS in some of the examples described herein are successful or unsuccessful (e.g., exception handling (EHR), SLMP, or link profile submissions, etc.), or otherwise indicate a status of resource link management (LMS) and associated components. The control lighting patterns, images, or colors on the display or indicators 42 may be reflective of the status of any of the method flows or components in the FIG.'s illustrated or discussed herein (e.g., FIGS. 12-16 and FIG. 24-FIG. 26, etc).

The processor 32 may receive power from the power source 48, and may be configured to distribute and/or control the power to the other components in the M2M device 30. The power source 48 may be any suitable device for powering the M2M device 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M device 30. It will be appreciated that the M2M device 30 may acquire location information by way of any suitable location-determination method while remaining consistent with what is disclosed herein.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

FIG. 28D is a block diagram of an exemplary computing system 90 on which, for example, the M2M service platform 22 of FIG. 28A and FIG. 28B may be implemented. Computing system 90 may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for resource link management (LMS), such as receiving link profiles or EHRs.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain network adaptor 97 that may be used to connect computing system 90 to an external communications network, such as network 12 of FIG. 28A and FIG. 28B.

It is understood that any or all of the systems, methods and processes described herein may be embodied in the form of computer executable instructions (i.e., program code) stored on a computer-readable storage medium which instructions, when executed by a machine, such as a computer, server, M2M terminal device, M2M gateway device, or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any method or technology for storage of information, but such computer readable storage media do not includes signals per se. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other physical medium which can be used to store the desired information and which can be accessed by a computer.

In describing preferred examples, of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. A device that manages resource links, the device comprising:
 a processor; and
 a memory coupled with the processor, the memory comprising executable instructions that when executed by the processor cause the processor to effectuate operations comprising:
  receiving a first link profile from a first entity, the first link profile comprising instructions for how to dynamically configure the value of an attribute link of a first resource corresponding with a first machine-to-machine (M2M) device, wherein the value of an attribute link of the first resource is a first identifier value that is directed to a second resource corresponding with a second machine-to-machine (M2M) device;
  monitoring for a condition associated with the first link profile, wherein the condition associated with the first link profile comprises:
   a first time period in which the attribute link of the first resource that is directed to the second resource is not active for a mobile device at a location, and
   a second time period in which a second attribute link directed to the second resource is active for the mobile device at the location;

determining that the condition associated with the first link profile has been met, wherein the condition associated with the first link profile comprises a third time period in which the attribute link of the first resource that is directed to second resource is not valid based on a node associated with the second resource being in a sleep type mode; and in response to the condition being met, dynamically configuring the value of the attribute link of the first resource to the second attribute link based on the instructions described in the first link profile, wherein the second attribute link is a second identifier value that is directed to a third resource, wherein the first resource, second resource, and the third resource are different.

2. The device of claim 1, wherein the condition associated with the first link profile comprises context information of a mobile device associated with the first resource.

3. The device of claim 1, wherein the condition associated with the first link profile comprises context information of a first entity associated with the first resource, wherein the context information comprises bandwidth.

4. A method for resource link management of a service layer, the method comprising:

receiving a first link profile from a first entity, the first link profile comprising instructions for how to dynamically configure the value of an attribute link of a first resource corresponding with a first machine-to-machine (M2M) device, wherein the value of an attribute link of the first resource is a first identifier value that is directed to a second resource corresponding with a second machine-to-machine (M2M) device;

monitoring for a condition associated with the first link profile, wherein the condition associated with the first link profile comprises:
  a first time period in which the attribute link of the first resource that is directed to the second resource is not active for a mobile device at a location, and
  a second time period in which a second attribute link directed to the second resource is active for the mobile device at the location;

determining that the condition associated with the first link profile has been met, wherein the condition associated with the first link profile comprises a third time period in which the attribute link of the first resource that is directed to second resource is not valid based on a node associated with the second resource being in a sleep type mode; and in response to the condition being met, dynamically configuring the value of the attribute link of the first resource to the second attribute link based on the instructions described in the first link profile, wherein the second attribute link is a second identifier value that is directed to a third resource, wherein the first resource, second resource, and the third resource are different.

5. The method of claim 4, wherein the condition associated with the first link profile comprises context information of a first entity associated with the first resource.

6. The method of claim 4, wherein the condition associated with the first link profile comprises context information of a first entity associated with the first resource, wherein the context information comprises latency of a communication session, wherein the first entity is mobile device.

7. A computer readable storage medium comprising computer executable instructions that when executed by a computing device cause said computing device to effectuate operations comprising:

receiving a first link profile from a first entity, the first link profile comprising instructions for how to dynamically configure the value of an attribute link of a first resource corresponding with a first machine-to-machine (M2M) device, wherein the value of an attribute link of the first resource is a first identifier value that is directed to a second resource corresponding with a second machine-to-machine (M2M) device;

monitoring for a condition associated with the first link profile, wherein the condition associated with the first link profile comprises:
  a first time period in which the attribute link of the first resource that is directed to the second resource is not active for a mobile device at a location, and
  a second time period in which a second attribute link directed to the second resource is active for the mobile device at the location;

determining that the condition associated with the first link profile has been met, wherein the condition associated with the first link profile comprises a third time period in which the attribute link of the first resource that is directed to second resource is not valid based on a node associated with the second resource being in a sleep type mode; and in response to the condition being met, dynamically configuring the value of the attribute link of the first resource to the second attribute link based on the instructions described in the first link profile, wherein the second attribute link is a second identifier value that is directed to a third resource, wherein the first resource, second resource, and the third resource are different.

8. The computer readable storage medium of claim 7, wherein the condition associated with the first link profile comprises context information of a first entity associated with the first resource, wherein the context information comprises power control requirements.

* * * * *